(12) United States Patent
Chiueh et al.

(10) Patent No.: US 10,506,139 B2
(45) Date of Patent: Dec. 10, 2019

(54) RECONFIGURABLE PIN-TO-PIN INTERFACE CAPABLE OF SUPPORTING DIFFERENT LANE COMBINATIONS AND/OR DIFFERENT PHYSICAL LAYERS AND ASSOCIATED METHOD

(71) Applicant: MEDIATEK INC., Hsin-Chu (TW)

(72) Inventors: Li-Hung Chiueh, Hsinchu (TW);
Man-Ju Lee, Yilan County (TW);
Chen-Yu Hsiao, Pingtung County (TW); Ching-Hsiang Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/027,263

(22) Filed: Jul. 3, 2018

(65) Prior Publication Data
US 2019/0045090 A1    Feb. 7, 2019

Related U.S. Application Data

(60) Provisional application No. 62/540,629, filed on Aug. 3, 2017.

(51) Int. Cl.
| | |
|---|---|
| *H04N 5/08* | (2006.01) |
| *H04N 5/247* | (2006.01) |
| *G06F 13/38* | (2006.01) |
| *G06F 13/40* | (2006.01) |
| *H04M 1/02* | (2006.01) |

(52) U.S. Cl.
CPC ............. *H04N 5/08* (2013.01); *G06F 13/385* (2013.01); *G06F 13/4063* (2013.01); *H04N 5/247* (2013.01); *H04M 1/0274* (2013.01)

(58) Field of Classification Search
None
See application file for complete search history.

(56) References Cited

U.S. PATENT DOCUMENTS

| | | | |
|---|---|---|---|
| 7,814,255 B1 * | 10/2010 | Deva | G06F 13/4081 710/10 |
| 8,612,795 B1 | 12/2013 | Ding | |
| 2013/0007502 A1 | 1/2013 | Iyer | |
| 2014/0009633 A1 | 1/2014 | Chopra | |
| 2016/0293096 A1 * | 10/2016 | Nose | G09G 3/2096 |
| 2016/0378711 A1 | 12/2016 | Iyer | |
| 2016/0380755 A1 * | 12/2016 | Sengoku | H04L 7/0087 375/355 |

(Continued)

*Primary Examiner* — Henry Tsai
*Assistant Examiner* — Aurangzeb Hassan
(74) *Attorney, Agent, or Firm* — Winston Hsu

(57) ABSTRACT

A reconfigurable pin-to-pin interface includes lane circuits and a reconfiguration circuit. A first lane circuit of the lane circuits obtains a first received signal by receiving a first input signal transmitted via a first lane. A second lane circuit of the lane circuits obtains a second received signal by receiving a second input signal transmitted via a second lane. When the second lane is used as one data lane and the first lane is used as one clock lane, the reconfiguration circuit redirects the first received signal to the second lane circuit for acting as an clock input of the second lane circuit. When the first lane is used as one data lane, the reconfiguration circuit blocks the first received signal from being redirected to the second lane circuit for acting as the clock input of the second lane circuit.

17 Claims, 8 Drawing Sheets

(56) References Cited

U.S. PATENT DOCUMENTS

| | | | |
|---|---|---|---|
| 2017/0019186 A1* | 1/2017 | Wiley | H04B 10/801 |
| 2017/0177353 A1* | 6/2017 | Ould-Ahmed-Vall | ........................ G06F 9/30018 |
| 2017/0195111 A1* | 7/2017 | Takahashi | G06F 13/42 |
| 2017/0272231 A1* | 9/2017 | Chen | G06F 13/40 |
| 2017/0286327 A1* | 10/2017 | Zhang | G06F 13/4068 |

* cited by examiner

RECONFIGURABLE PIN-TO-PIN INTERFACE CAPABLE OF SUPPORTING DIFFERENT LANE COMBINATIONS AND/OR DIFFERENT PHYSICAL LAYERS AND ASSOCIATED METHOD

CROSS REFERENCE TO RELATED APPLICATIONS

This application claims the benefit of U.S. provisional application No. 62/540,629, filed on Aug. 3, 2017 and incorporated herein by reference.

BACKGROUND

The disclosed embodiments of the present invention relate to using a pin-to-pin interface for receiving data signal(s) and clock signal(s), and more particularly, to a reconfigurable pin-to-pin interface capable of supporting different lane combinations and/or different physical layers and associated method.

A camera interface may be a pin-to-pin interface disposed between a first chip and a second chip to transmit multimedia data from the first chip to the second chip for further processing. For example, the first chip may include a camera module, and the second chip may include an image signal processor (ISP). The multimedia data may include image data (i.e., a single captured image) or video data (i.e., a video sequence composed of captured images). Multi-camera usage is popular in mobile and automotive applications, and it requires more and more camera interface macros. In a typical design, one camera interface is dedicated to one camera module only. When an application (e.g., a mobile phone or an automobile) is equipped with front and rear dual cameras, four camera interfaces are needed. Further, a compatible solution for multiple physical layers will be the trend. A traditional design is using two specialized camera interfaces to support two physical layers, individually. If an application (e.g., a mobile phone or an automobile) is configured to support multiple cameras and multiple physical layers, the chip area/cost is increased inevitably.

SUMMARY

In accordance with exemplary embodiments of the present invention, a reconfigurable pin-to-pin interface capable of supporting different lane combinations and/or different physical layers and associated method are proposed.

According to a first aspect of the present invention, an exemplary reconfigurable pin-to-pin interface is disclosed. The exemplary reconfigurable pin-to-pin interface includes a plurality of lane circuits and a reconfiguration circuit. Each of the lane circuits is arranged to obtain a received signal by receiving an input signal transmitted via a lane. The lane circuits comprise a first lane circuit arranged to obtain a first received signal by receiving a first input signal transmitted via a first lane, and a second lane circuit arranged to obtain a second received signal by receiving a second input signal transmitted via a second lane. When the second lane is used as one data lane and the first lane is used as one clock lane, the reconfiguration circuit is arranged to redirect the first received signal to the second lane circuit for acting as a clock input of the second lane circuit. When the first lane is used as one data lane, the reconfiguration circuit is arranged to block the first received signal from being redirected to the second lane circuit for acting as the clock input of the second lane circuit.

According to a second aspect of the present invention, an exemplary reconfigurable pin-to-pin interface is disclosed. The exemplary reconfigurable pin-to-pin interface includes a plurality of lane circuits and a reconfiguration circuit. Each of the lane circuits is arranged to obtain a received signal by receiving an input signal transmitted via a lane. The lane circuits comprise a first lane circuit arranged to obtain a first received signal by receiving a first input signal transmitted via a first lane, and a second lane circuit arranged to obtain a second received signal by receiving a second input signal transmitted via a second lane. The reconfiguration circuit comprises a first switch circuit coupled to an output port of the first lane circuit and a clock input port of the second lane circuit. The first switch circuit comprises at least one switch, and is arranged to selectively redirect the first received signal at the output port of the first lane circuit to the clock input port of the second lane circuit.

According to a third aspect of the present invention, an exemplary method for setting a reconfigurable pin-to-pin interface is disclosed. The reconfigurable pin-to-pin interface comprises a first lane circuit arranged to obtain a first received signal by receiving a first input signal transmitted via a first lane and a second lane circuit arranged to obtain a second received signal by receiving a second input signal transmitted via a second lane. The exemplary method comprises: when the second lane is used as one data lane and the first lane is used as one clock lane, redirecting the first received signal to the second lane circuit for acting as an clock input of the second lane circuit; and when the first lane is used as one data lane, blocking the first received signal from being redirected to the second lane circuit for acting as the clock input of the second lane circuit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes a reconfigurable pin-to-pin interface which is capable of supporting different lane combinations and/or different physical layers. One inventive concept of the proposed reconfigurable pin-to-pin interface is that one lane can be flexibly configured to act as a data lane or a clock lane. For example, a clock lane and a data lane can be swapped flexibly by controlling the internal clock delivery. In this way, a camera interface decomposition function and a camera interface assembly function can be realized on the same reconfigurable pin-to-pin interface. Another inventive concept of the proposed reconfigurable pin-to-pin interface is that a pin assignment can be adjusted according to the physical layer(s). In this way, at least a part of lane circuits implemented in the proposed reconfigurable pin-to-pin interface can be compatible with different physical layers. Further details of the proposed reconfigurable pin-to-pin interface are provided as below.

Figure 1:
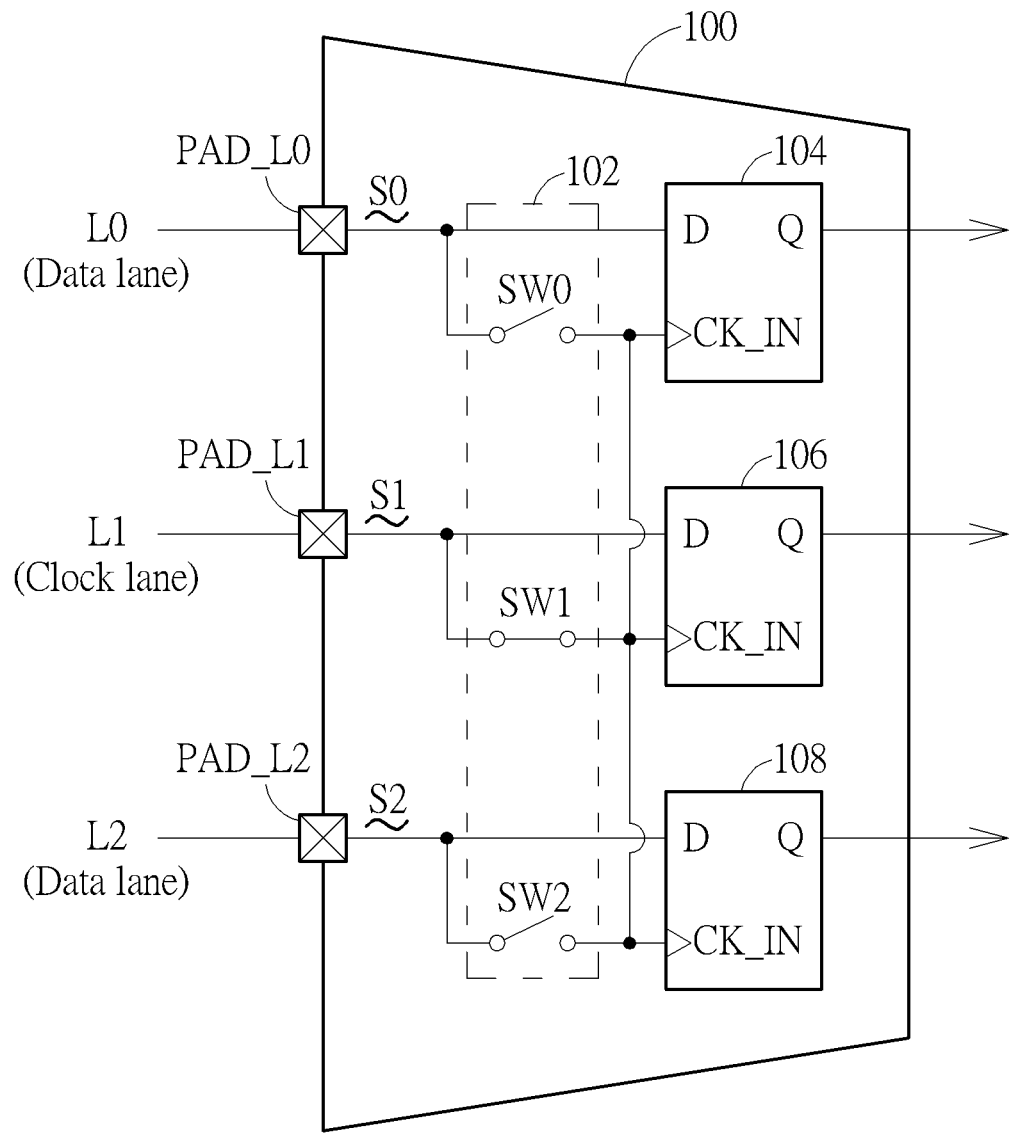
FIG. 1 is a diagram illustrating a concept of setting a reconfigurable pin-to-pin interface according to an embodiment of the present invention.

FIG. 1 is a diagram illustrating a concept of setting a reconfigurable pin-to-pin interface according to an embodiment of the present invention. By way of example, but not limitation, the reconfigurable pin-to-pin interface 100 may be used as a camera serial interface (CSI) of a Mobile Industry Processor Interface (MIPI). For clarity and simplicity, only three lanes L0, L1, and L2 are shown in FIG. 1. The reconfigurable pin-to-pin interface 100 is a part of a chip, and has connection ports PAD_L0, PAD_L1, and PAD_L2 coupled to the external lanes L0, L1, and L2, respectively. In a case where each of the lanes L0, L1, and L2 is used to transmit a differential signal (e.g., each of the lanes L0, L1, and L2 is a 2-wire MIPI D-PHY lane), each of the connection ports PAD_L0, PAD_L1, and PAD_L2 includes two pins connected to a positive signal wire and a negative signal wire of the connected lane. The reconfigurable pin-to-pin interface 100 includes a switch circuit 102 and three samplers 104, 106, and 108. For example, each of the samplers 104, 106, and 108 may be implemented using a D-type flip-flop (DFF) having a data input port (denoted by "D"), a data output port (denoted by "Q"), and one clock input port (denoted by "CK_IN"). In addition, the switch circuit 102 includes a plurality of switches SW0, SW1, and SW2. The switch circuit 102 is arranged to control whether one lane is used as a data lane or a clock lane. For example, the internal clock delivery can be controlled by the switch circuit 102, such that a clock signal received from one lane that acts as a clock lane can be used to sample data signals received from other lanes that act as data lanes.

In this example, the reconfigurable pin-to-pin interface 100 can support a 2D1C lane combination (e.g., a 2D1C D-PHY configuration) in which one of the lanes L0, L1, and L2 is used as one clock lane and the rest of the lanes L0, L1, and L2 are used as two data lanes. As shown in FIG. 1, the lanes L0 and L2 are used as data lanes, and the lane L1 is used as a clock lane. Hence, a clock signal is transmitted to the connection port PAD_L1 via the lane L1, a first data signal is transmitted to the connection port PAD_L0 via the lane L0, and a second data signal is transmitted to the connection port PAD_L2 via the lane L2. The switch SW0 is switched off, the switch SW1 is switched on, and the switch SW2 is switched off. Hence, a received signal S1 obtained by receiving the clock signal from the connection port PAD_L1 is redirected to the clock input ports CK_IN of the samplers 104 and 108 for acting as clock inputs of the samplers 104 and 108. A received signal S0 obtained by receiving the first data signal from the connection port PAD_L0 is fed into the data input port D of the sampler 104, and is sampled at rising edges (or falling edges) of the received signal S1 to generate a data output at the data output port Q of the sampler 104. A received signal S2 obtained by receiving the second data signal from the connection port PAD_L2 is fed into the data input port D of the sampler 108, and is sampled at rising edges (or falling edges) of the received signal S1 to generate a data output at the data output port Q of the sampler 108.

Since the lanes L0 and L2 are used as data lanes, the following data processing circuitry (not shown) retrieves the data outputs from the samplers 104 and 108 for further processing. In addition, the received signal S0 is blocked from being redirected to the samplers 106 and 108 for acting as clock inputs of the samplers 106 and 108, and the received signal S2 is blocked from being redirected to the samplers 104 and 106 for acting as clock inputs of the samplers 104 and 106. Since the lane L1 is used as a clock lane, the data output of the sampler 106 is invalid, and the following data processing circuitry (not shown) may not retrieve the data output from the sampler 106 for further processing. In other words, the data output at the data output port Q of the sampler 106 may be ignored by the following data processing circuitry (not shown).

As shown in FIG. 1, the lanes L0 and L2 can be used as data lanes and the lane L1 can be used as a clock lane under a proper setting of the switch circuit 102. Since the switch circuit 102 is capable of controlling whether one lane is used as a data lane or a clock lane, the reconfigurable pin-to-pin circuit 100 may be used to support a different 2D1C lane combination by swapping a data line and a clock lane.

Figure 2:
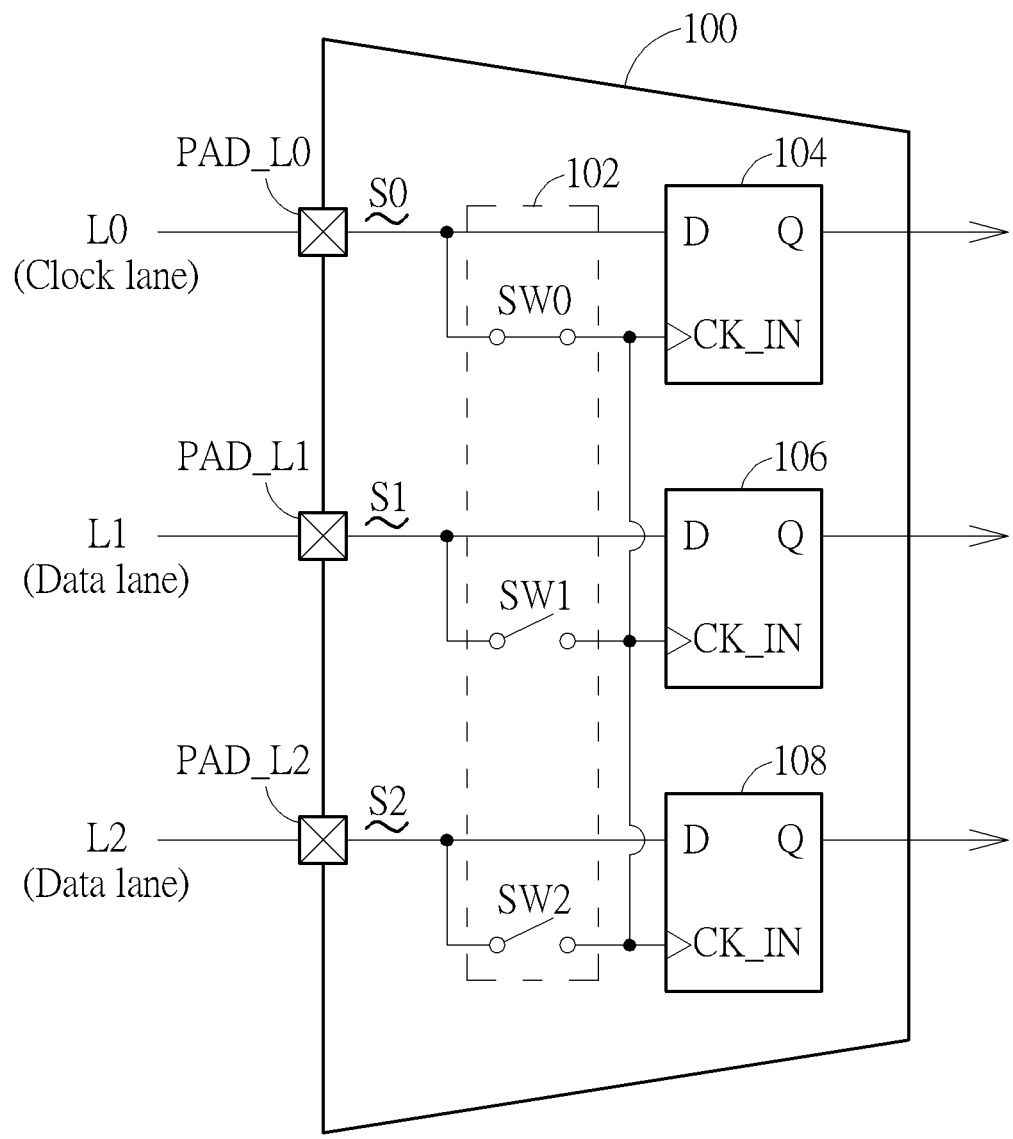
FIG. 2 is a diagram illustrating another 2D1C lane combination (e.g., 2D1C D-PHY configuration) supported by the reconfigurable pin-to-pin interface shown in FIG. 1 according to an embodiment of the present invention.

FIG. 2 is a diagram illustrating another 2D1C lane combination (e.g., 2D1C D-PHY configuration) supported by the reconfigurable pin-to-pin interface 100 shown in FIG. 1 according to an embodiment of the present invention. As shown in FIG. 2, the lanes L1 and L2 are used as data lanes, and the lane L0 is used as a clock lane. Hence, a clock signal is transmitted to the connection port PAD_L0 via the lane L0, a first data signal is transmitted to the connection port PAD_L1 via the lane L1, and a second data signal is transmitted to the connection port PAD_L2 via the lane L2. The switch SW0 is switched on, the switch SW1 is switched off, and the switch SW2 is switched off. Hence, a received signal S0 obtained by receiving the clock signal from the connection port PAD_L0 is redirected to the clock input ports CK_IN of the samplers 106 and 108 for acting as clock inputs of the samplers 106 and 108. A received signal S1 obtained by receiving the first data signal from the connection port PAD_L1 is fed into the data input port D of the sampler 106, and is sampled at rising edges (or falling edges) of the received signal S0 to generate a data output at the data output port Q of the sampler 106. A received signal S2 obtained by receiving the second data signal from the connection port PAD_L2 is fed into the data input port D of the sampler 108, and is sampled at rising edges (or falling edges) of the received signal S1 to generate a data output at the data output port Q of the sampler 108.

Since the lanes L1 and L2 are used as data lanes, the following data processing circuitry (not shown) retrieves the data outputs from the samplers 106 and 108 for further processing. In addition, the received signal S1 is blocked from being redirected to the samplers 104 and 108 for acting as clock inputs of the samplers 104 and 108, and the received signal S1 is blocked from being redirected to the samplers 104 and 106 for acting as clock inputs of the samplers 104 and 106. Since the lane L0 is used as a clock lane, the data output of the sampler 104 is invalid, and the following data processing circuitry (not shown) may not retrieve the data output from the sampler 104 for further processing. In other words, the data output at the data output port Q of the sampler 104 may be ignored by the following data processing circuitry (not shown).

Figure 3:
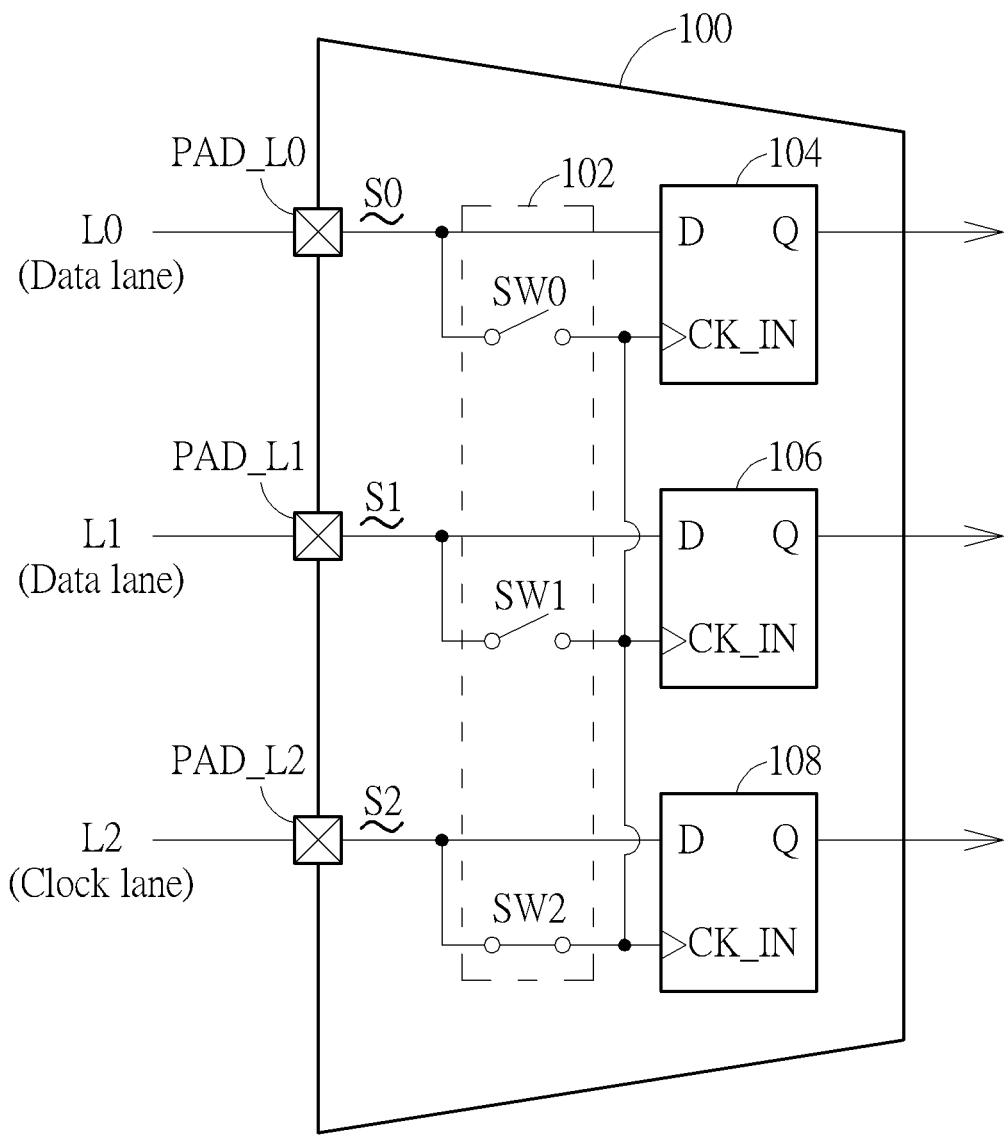
FIG. 3 is a diagram illustrating yet another 2D1C lane combination (e.g., 2D1C D-PHY configuration) supported by the reconfigurable pin-to-pin interface shown in FIG. 1 according to an embodiment of the present invention.

FIG. 3 is a diagram illustrating yet another 2D1C lane combination (e.g., 2D1C D-PHY configuration) supported by the reconfigurable pin-to-pin interface 100 shown in FIG. 1 according to an embodiment of the present invention. As shown in FIG. 3, the lanes L0 and L1 are used as data lanes, and the lane L2 is used as a clock lane. Hence, a clock signal is transmitted to the connection port PAD_L2 via the lane L2, a first data signal is transmitted to the connection port PAD_L0 via the lane L0, and a second data signal is transmitted to the connection port PAD_L1 via the lane L1. The switch SW0 is switched off, the switch SW1 is switched off, and the switch SW2 is switched on. Hence, a received signal S2 obtained by receiving the clock signal from the connection port PAD_L2 is redirected to the clock input ports CK_IN of the samplers 104 and 106 for acting as clock inputs of the samplers 104 and 106. A received signal S0 obtained by receiving the first data signal from the connection port PAD_L0 is fed into the data input port D of the sampler 104, and is sampled at rising edges (or falling edges) of the received signal S2 to generate a data output at the data output port Q of the sampler 104. A received signal S1 obtained by receiving the second data signal from the connection port PAD_L1 is fed into the data input port D of the sampler 106, and is sampled at rising edges (or falling edges) of the received signal S2 to generate a data output at the data output port Q of the sampler 106.

Since the lanes L0 and L1 are used as data lanes, the following data processing circuitry (not shown) retrieves the data outputs from the samplers 104 and 106 for further processing. In addition, the received signal S0 is blocked from being redirected to the samplers 106 and 108 for acting as clock inputs of the samplers 106 and 108, and the received signal S2 is blocked from being redirected to the samplers 104 and 108 for acting as clock inputs of the samplers 104 and 108. Since the lane L2 is used as a clock lane, the data output of the sampler 108 is invalid, and the following data processing circuitry (not shown) may not retrieve the data output from the sampler 108 for further processing. In other words, the data output at the data output port Q of the sampler 108 may be ignored by the following data processing circuitry (not shown).

The reconfigurable pin-to-pin interface 100 can support any of the 2D1C lane combinations shown in FIGS. 1-3 with proper settings of internal switches SW0-SW3 included in the switch circuit 102. Based on such an inventive concept, a reconfigurable pin-to-pin interface supporting more than one lane combination type (e.g., 1D1C lane combination type, 2D1C lane combination type, and/or 4D1C lane combination type) can be achieved.

Figure 4:
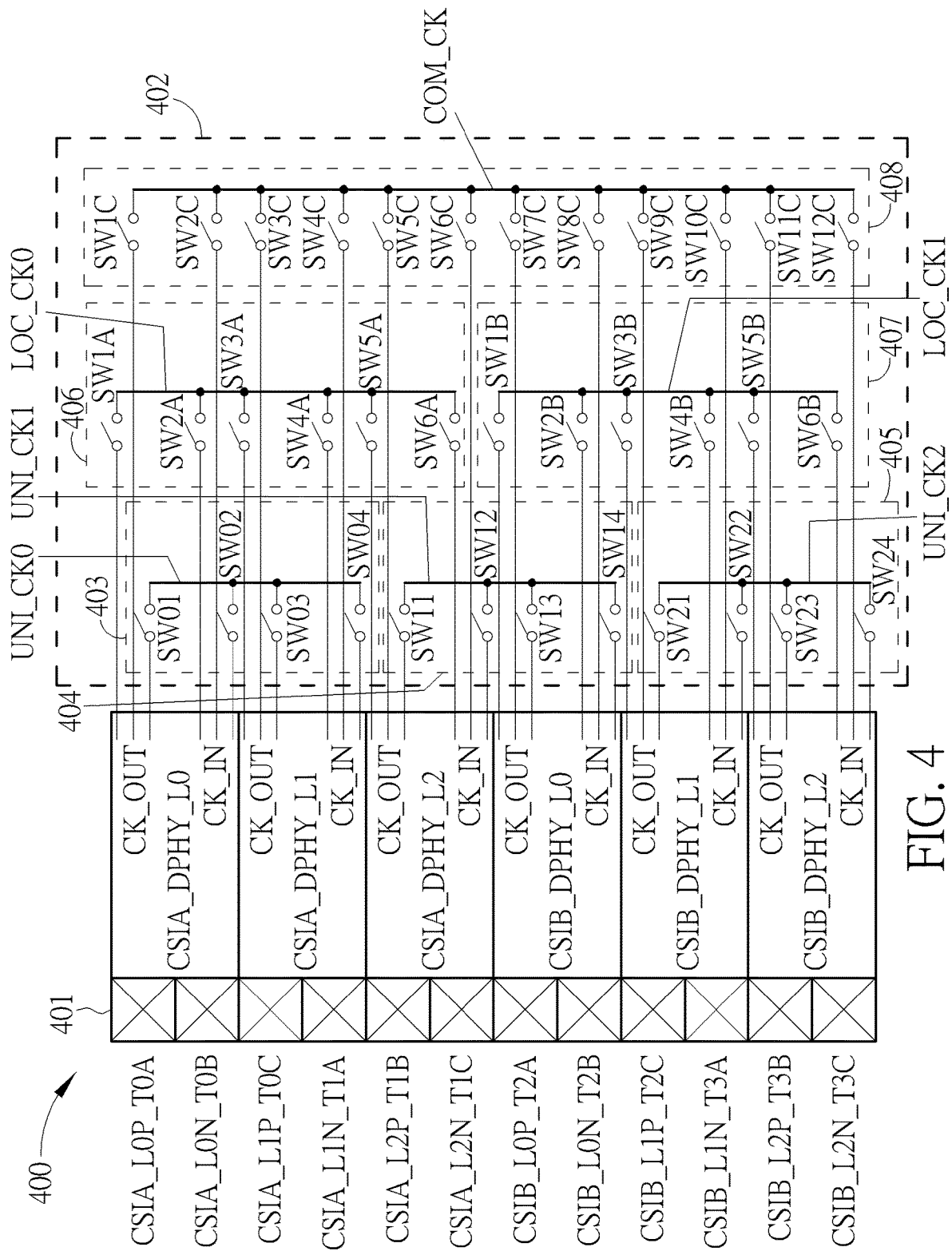
FIG. 4 is a diagram illustrating a first reconfigurable pin-to-pin interface supporting different lane combination types according to an embodiment of the present invention.

FIG. 4 is a diagram illustrating a first reconfigurable pin-to-pin interface supporting different lane combination types according to an embodiment of the present invention. By way of example, but not limitation, the reconfigurable pin-to-pin interface 400 may be used as a MIPI CSI for connecting a first chip to a second chip, where the first chip may include one or more camera modules, and the second chip may include one or more ISPs. The reconfigurable pin-to-pin interface 400 is a part of a chip, and has a plurality of pins (or pads) 401 connected to a plurality of external signal wires CSIA_L0P_T0A, CSIA_L0N_T0B, CSIA_L1P_T0C, CSIA_L1N_T1A, CSIA_L2P_T1B, CSIA_L2N_T1C, CSIB_L0P_T2A, CSIB_L0N_T2B, CSIB_L1P_T2C, CSIB_L1N_T3A, CSIB_L2P_T3B, and CSIB_L2N_T3C, respectively. Suppose that a physical layer (PHY) of the reconfigurable pin-to-pin interface 400 is MIPI D-PHY. Hence, a PHY configuration includes a clock signal and one or more data signals. In addition, differential signaling is used by MIPI D-PHY, such that each D-PHY lane is a 2-wire link. For example, each D-PHY data lane for transmitting one data signal (which is a differential signal) requires two signal wires, and each D-PHY clock lane used for transmitting one clock signal (which is a differential signal) also requires two signal wires.

In this embodiment, the reconfigurable pin-to-pin interface 400 includes a reconfiguration circuit 402 and a plurality of lane circuits CSIA_DPHY_L0, CSIA_DPHY_L1, CSIA_DPHY_L2, CSIB_DPHY_L0, CSIB_DPHY_L1, and CSIB_DPHY_L2, where the lane circuit CSIA_DPHY_L0 is arranged to obtain a first received signal by receiving a first input signal transmitted via a first lane having two signal wires CSIA_L0P_T0A and CSIA_L0N_T0B, the lane circuit CSIA_DPHY_L1 is arranged to obtain a second received signal by receiving a second input signal transmitted via a second lane having two signal wires CSIA_L1P_T0C and CSIA_L1N_T1A, the lane circuit CSIA_DPHY_L2 is arranged to obtain a third received signal by receiving a third input signal transmitted via a third lane having two signal wires CSIA_L2P_T1B and CSIA_L2N_T1C, the lane circuit CSIB_DPHY_L0 is arranged to obtain a fourth received signal by receiving a fourth input signal transmitted via a fourth lane having two signal wires CSIB_L0P_T2A and CSIB_L0N_T2B, the lane circuit CSIB_DPHY_L1 is arranged to obtain a fifth received signal by receiving a fifth input signal transmitted via a fifth lane having two signal wires CSIB_L1P_T2C and CSIB_L1N_T3A, and the lane circuit CSIB_DPHY_L2 is arranged to obtain a sixth received signal by receiving a sixth input signal transmitted via a sixth lane having two signal wires CSIB_L2P_T3B and CSIB_L2N_T3C.

Each of the lane circuits CSIA_DPHY_L0, CSIA_DPHY_L1, CSIA_DPHY_L2, CSIB_DPHY_L0, CSIB_DPHY_L1, and CSIB_DPHY_L2 has an output port CK_OUT and a clock input port CK_IN, where the output port CK_OUT may be selectively connected to clock input port(s) CK_IN of other lane circuit(s) or disconnected from clock input port(s) CK_IN of other lane circuit (s). For example, an equalizer and a sampler (e.g., a DFF shown in FIG. 1) may be implemented in each of the lane circuits CSIA_DPHY_L0, CSIA_DPHY_L1, CSIA_DPHY_L2, CSIB_DPHY_L0, CSIB_DPHY_L1, and CSIB_DPHY_L2. An input signal (which is a differential signal) received from a pair of pins (or pads) 401 is processed by the equalizer of a lane circuit, and an equalizer output generated at the output port CK_OUT of the equalizer may be fed into the data input port of the sampler in the same lane circuit, and may be selectively fed into clock input port(s) CK_IN of sampler(s) in other lane circuit(s).

In this embodiment, the reconfigurable pin-to-pin interface 400 is capable of supporting different lane combinations (i.e., different PHY configurations). For example, the reconfigurable pin-to-pin interface 400 is capable of supporting the 1D1C lane combination type, the 2D1C lane combination type, and the 4D1C lane combination type. Enabling/disabling of 1D1C lane combination(s), 2D1C lane combination(s) and/or 4D1C lane combination is controlled by the reconfiguration circuit 402.

As shown in FIG. 4, the reconfiguration circuit 402 includes a plurality of switch circuits 403, 404, 405, 406, 407, and 408. The switch circuit 403 includes switches SW01, SW02, SW03, and SW04, each of which has one end coupled to an internal clock lane UNI_CK0. The switch circuit 404 includes switches SW11, SW12, SW13, and SW14, each of which has one end coupled to an internal clock lane UNI_CK1. The switch circuit 405 includes switches SW21, SW22, SW23, and SW24, each of which has one end coupled to an internal clock lane UNI_CK2. The switch circuit 406 includes switches SW1A, SW2A, SW3A, SW4A, SW5A, and SW6A, each of which has one end coupled to an internal clock lane LOC_CK0. The switch circuit 407 includes switches SW1B, SW2B, SW3B, SW4B, SW5B, and SW6B, each of which has one end coupled to an internal clock lane LOC_CK1. The switch circuit 408 includes switches SW1C, SW2C, SW3C, SW4C, SW5C, SW6C, SW7C, SW8C, SW9C, SW10C, SW11C, and SW12C, each of which has one end coupled to an internal clock lane COM_CK.

It should be noted that an on/off status of each switch included in the switch circuits 403-408 may be set by a control circuit (not shown) of the reconfiguration circuit 402. For example, only one of the lane circuits CSIA_DPHY_L0 and CSIA_DPHY_L1 is allowed to output a clock signal to the internal clock lane UNI_CK0 via the switch circuit 403, only one of the lane circuits CSIA_DPHY_L2 and CSIB_DPHY_L0 is allowed to output a clock signal to the internal clock lane UNI_CK1 via the switch circuit 404, only one of the lane circuits CSIB_DPHY_L1 and CSIB_DPHY_L2 is allowed to output a clock signal to the internal clock lane UNI_CK2 via the clock switch 405, only one of the lane circuits CSIA_DPHY_L0-CSIA_DPHY_L2 is allowed to output a clock signal to the internal clock lane LOC_CK0 via the clock circuit 406, only one of the lane circuits CSIB_DPHY_L0-CSIB_DPHY_L2 is allowed to output a clock signal to the internal clock lane LOC_CK1 via the clock circuit 407, and only one of the lane circuits CSIA_DPHY_L0-CSIA_DPHY_L2 and CSIB_DPHY_L0-CSIB_DPHY_L2 is allowed to output a clock signal to the internal clock lane COM_CK via the clock switch 408.

In a case where an application requires that the reconfigurable pin-to-pin interface 400 is configured to support one or more 1D1C lane combinations, one or more of the switch circuits 403-405 should be properly controlled to enable the associated internal clock lane (s) UNI_CK0/UNI_CK1/UNI_CK2.

When the reconfigurable pin-to-pin interface 400 is configured to support a 1D1C lane combination in which one external lane (which includes signal wires CSIA_L0P_T0A and CSIA_L0N_T0B) is used as a clock lane and the other external lane (which includes signal wires CSIA_L1P_T0C and CSIA_L1N_T1A) is used as a data lane, the switch circuit 403 is controlled to have the switches SW01 and SW04 switched on and the switches SW02 and SW03 switched off. In this way, a received signal obtained at the output port CK_OUT of an equalizer included in the lane circuit CSIA_DPHY_L0 by receiving a clock signal transmitted via one external lane (which includes signal wires CSIA_L0P_T0A and CSIA_L0N_T0B) is redirected to the clock input port CK_IN of a sampler included in the lane circuit CSIA_DPHY_L1 for acting as a clock input of the sample included in the lane circuit CSIA_DPHY_L1.

Further, a received signal obtained at the output port CK_OUT of an equalizer included in the lane circuit CSIA_DPHY_L1 by receiving a data signal transmitted via the other external lane (which includes signal wires CSIA_L1P_T0C and CSIA_L1N_T1A) is fed into a data input port of the sampler included in the lane circuit CSIA_DPHY_L1, and is blocked from being redirected to the clock input port CK_IN of a sampler included in the lane circuit CSIA_DPHY_L0 for acting as a clock input of the sampler included in the lane circuit CSIA_DPHY_L0. It should be noted that a data output at a data output port of the sampler included in the lane circuit CSIA_DPHY_L0 is invalid, and may be prevented from being retrieved and processed by the following data processing circuitry.

Alternatively, when the reconfigurable pin-to-pin interface 400 is configured to support a 1D1C lane combination in which one external lane (which includes signal wires CSIA_L1P_T0C and CSIA_L1N_T1A) is used as a clock lane and the other external lane (which includes signal wires CSIA_L0P_T0A and CSIA_L0N_T0B) is used as a data lane, the switch circuit 403 is controlled to have the switches SW02 and SW03 switched on and the switches SW01 and SW04 switched off. In this way, a received signal obtained at the output port CK_OUT of an equalizer included in the lane circuit CSIA_DPHY_L1 by receiving a clock signal transmitted via one external lane (which includes signal wires CSIA_L1P_T0C and CSIA_L1N_T1A) is redirected to the clock input port CK_IN of a sampler included in the lane circuit CSIA_DPHY_L0 for acting as a clock input of the sample included in the lane circuit CSIA_DPHY_L0.

Further, a received signal obtained at the output port CK_OUT of an equalizer included in the lane circuit CSIA_DPHY_L0 by receiving a data signal transmitted via the other external lane (which includes signal wires CSIA_L0P_T0A and CSIA_L0N_T0B) is fed into a data input port of the sampler included in the lane circuit CSIA_DPHY_L0, and is blocked from being redirected to the clock input port CK_IN of a sampler included in the lane circuit CSIA_DPHY_L1 for acting as a clock input of the sampler included in the lane circuit CSIA_DPHY_L1. It should be noted that a data output at a data output port of the sampler included in the lane circuit CSIA_DPHY_L1 is invalid, and may be prevented from being retrieved and processed by the following data processing circuitry.

Like the switch circuit 403, each of the switch circuits 404 and 405 is able to enable one 1D1C lane combination. When the reconfigurable pin-to-pin interface 400 is configured to support a 1D1C lane combination in which one external lane (which includes signal wires CSIA_L2P_T1B and CSIA_L2N_T1C) is used as a clock lane and the other external lane (which includes signal wires CSIB_L0P_T2A and CSIB_L0N_T2B) is used as a data lane, the switch circuit 404 is controlled to have the switches SW11 and SW14 switched on and the switches SW12 and SW13 switched off. Alternatively, when the reconfigurable pin-to-pin interface 400 is configured to support a 1D1C lane combination in which one external lane (which includes signal wires CSIB_L0P_T2A and CSIB_L0N_T2B) is used as a clock lane and the other external lane (which includes signal wires CSIA_L2P_T1B and CSIA_L2N_T1C) is used as a data lane, the switch circuit 404 is controlled to have the switches SW12 and SW13 switched on and the switches SW11 and SW14 switched off.

When the reconfigurable pin-to-pin interface 400 is configured to support a 1D1C lane combination in which one external lane (which includes signal wires CSIB_L1P_T2C and CSIB_L1N_T3A) is used as a clock lane and the other external lane (which includes signal wires CSIB_L2P_T3B and CSIB_L2N_T3C) is used as a data lane, the switch circuit 405 is controlled to have the switches SW21 and SW24 switched on and the switches SW22 and SW23 switched off. Alternatively, when the reconfigurable pin-to-pin interface 400 is configured to support a 1D1C lane combination in which one external lane (which includes signal wires CSIB_L2P_T3B and CSIB_L2N_T3C) is used as a clock lane and the other external lane (which includes signal wires CSIB_L1P_T2C and CSIB_L1N_T3A) is used as a data lane, the switch circuit 405 is controlled to have the switches SW22 and SW23 switched on and the switches SW21 and SW24 switched off.

In a case where an application requires that the reconfigurable pin-to-pin interface 400 is configured to support one or both of 2D1C lane combinations, one or both of the switch circuits 406 and 407 should be properly controlled to enable the associated internal clock lane(s) LOC_CK0/LOC_CK1.

When the reconfigurable pin-to-pin interface 400 is configured to support a 2D1C lane combination in which one external lane (which includes signal wires CSIA_L0P_T0A and CSIA_L0N_T0B) is used as a clock lane, another external lane (which includes signal wires CSIA_L1P_T0C and CSIA_L1N_T1A) is used as one data lane, and yet another external lane (which includes signal wires CSIA_L2P_T1B and CSIA_L2N_T1C) is used as another data lane, the switch circuit 406 is controlled to have the switches SW1A, SW4A, and SW6A switched on and the switches SW2A, SW3A, and SW5A switched off. In this way, a received signal obtained at the output port CK_OUT of an equalizer included in the lane circuit CSIA_DPHY_L0 by receiving a clock signal transmitted via one external lane (which includes signal wires CSIA_L0P_T0A and CSIA_L0N_T0B) is redirected to the clock input ports CK_IN of samplers included in the lane circuits CSIA_DPHY_L1 and CSIA_DPHY_L2 for acting as clock inputs of the samplers included in the lane circuits CSIA_DPHY_L1 and CSIA_DPHY_L2.

Further, a received signal obtained at the output port CK_OUT of an equalizer included in the lane circuit CSIA_DPHY_L1 by receiving one data signal transmitted via another external lane (which includes signal wires CSIA_L1P_T0C and CSIA_L1N_T1A) is fed into a data input port of the sampler included in the lane circuit CSIA_DPHY_L1, and is blocked from being redirected to clock input ports CK_IN of samplers included in the lane circuits CSIA_DPHY_L0 and CSIA_DPHY_L2 for acting as clock inputs of the samplers included in the lane circuits CSIA_DPHY_L0 and CSIA_DPHY_L2. In addition, a received signal obtained at the output port CK_OUT of an equalizer included in the lane circuit CSIA_DPHY_L2 by receiving a data signal transmitted via yet another external lane (which includes signal wires CSIA_L2P_T1B and CSIA_L2N_T1C) is fed into a data input port of the sampler included in the lane circuit CSIA_DPHY_L2, and is blocked from being redirected to clock input ports CK_IN of samplers included in the lane circuits CSIA_DPHY_L0 and CSIA_DPHY_L1 for acting as clock inputs of the samplers included in the lane circuits CSIA_DPHY_L0 and CSIA_DPHY_L1. It should be noted that a data output at a data output port of a sampler included in the lane circuit CSIA_DPHY_L0 is invalid, and may be prevented from being retrieved and processed by the following data processing circuitry.

Alternatively, when the reconfigurable pin-to-pin interface 400 is configured to support a 2D1C lane combination in which one external lane (which includes signal wires CSIA_L1P_T0C and CSIA_L1N_T1A) is used as a clock lane, another external lane (which includes signal wires CSIA_L0P_T0A and CSIA_L0N_T0B) is used as one data lane, and yet another external lane (which includes signal wires CSIA_L2P_T1B and CSIA_L2N_T1C) is used as another data lane, the switch circuit 406 is controlled to have the switches SW2A, SW3A, and SW6A switched on and the switches SW1A, SW4A, and SW5A switched off. In this way, a received signal obtained at the output port CK_OUT of an equalizer included in the lane circuit CSIA_DPHY_L1 by receiving a clock signal transmitted via one external lane (which includes signal wires CSIA_L1P_T0C and CSIA_L1N_T1A) is redirected to the clock input ports CK_IN of samplers included in the lane circuits CSIA_DPHY_L0 and CSIA_DPHY_L2 for acting as clock inputs of the samplers included in the lane circuits CSIA_DPHY_L0 and CSIA_DPHY_L2.

Further, a received signal obtained at the output port CK_OUT of an equalizer included in the lane circuit CSIA_DPHY_L0 by receiving one data signal transmitted via another external lane (which includes signal wires CSIA_L0P_T0A and CSIA_L0N_T0B) is fed into a data input port of the sampler included in the lane circuit CSIA_DPHY_L0, and is blocked from being redirected to clock input ports CK_IN of samplers included in the lane circuits CSIA_DPHY_L1 and CSIA_DPHY_L2 for acting as clock inputs of the samplers included in the lane circuits CSIA_DPHY_L1 and CSIA_DPHY_L2. In addition, a received signal obtained at the output port CK_OUT of an equalizer included in the lane circuit CSIA_DPHY_L2 by receiving a data signal transmitted via yet another external lane (which includes signal wires CSIA_L2P_T1B and CSIA_L2N_T1C) is fed into a data input port of the sampler included in the lane circuit CSIA_DPHY_L2, and is blocked from being redirected to clock input ports CK_IN of samplers included in the lane circuits CSIA_DPHY_L0 and CSIA_DPHY_L1 for acting as clock inputs of the samplers included in the lane circuits CSIA_DPHY_L0 and CSIA_DPHY_L1. It should be noted that a data output at a data output port of a sampler included in the lane circuit CSIA_DPHY_L1 is invalid, and may be prevented from being retrieved and processed by the following data processing circuitry.

Alternatively, when the reconfigurable pin-to-pin interface 400 is configured to support a 2D1C lane combination in which one external lane (which includes signal wires CSIA_L2P_T1B and CSIA_L2N_T1C) is used as a clock lane, another external lane (which includes signal wires CSIA_L0P_T0A and CSIA_L0N_T0B) is used as one data lane, and yet another external lane (which includes signal wires CSIA_L1P_T0C and CSIA_L1N_T1A) is used as another data lane, the switch circuit 406 is controlled to have the switches SW2A, SW4A, and SW5A switched on and the switches SW1A, SW3A, and SW6A switched off. In this way, a received signal obtained at the output port CK_OUT of an equalizer included in the lane circuit CSIA_DPHY_L2 by receiving a clock signal transmitted via one external lane (which includes signal wires CSIA_L2P_T1B and CSIA_L2N_T1C) is redirected to the clock input ports CK_IN of samplers included in the lane circuits CSIA_DPHY_L0 and CSIA_DPHY_L1 for acting as clock inputs of the samplers included in the lane circuits CSIA_DPHY_L0 and CSIA_DPHY_L1.

Further, a received signal obtained at the output port CK_OUT of an equalizer included in the lane circuit CSIA_DPHY_L0 by receiving one data signal transmitted via another external lane (which includes signal wires CSIA_L0P_T0A and CSIA_L0N_T0B) is fed into a data input port of the sampler included in the lane circuit CSIA_DPHY_L0, and is blocked from being redirected to clock input ports CK_IN of samplers included in the lane circuits CSIA_DPHY_L1 and CSIA_DPHY_L2 for acting as clock inputs of the samplers included in the lane circuits CSIA_DPHY_L1 and CSIA_DPHY_L2. In addition, a received signal obtained at the output port CK_OUT of an equalizer included in the lane circuit CSIA_DPHY_L1 by receiving a data signal transmitted via yet another external lane (which includes signal wires CSIA_L1P_T0C and CSIA_L1N_T1A) is fed into a data input port of the sampler included in the lane circuit CSIA_DPHY_L1, and is blocked from being redirected to clock input ports CK_IN of samplers included in the lane circuits CSIA_DPHY_L0 and CSIA_DPHY_L2 for acting as clock inputs of the samplers included in the lane circuits CSIA_DPHY_L0 and CSIA_DPHY_L2. It should be noted that a data output at a data output port of a sampler included in the lane circuit CSIA_DPHY_L2 is invalid, and may be prevented from being retrieved and processed by the following data processing circuitry.

Like the switch circuit 406, the switch circuit 407 is able to enable one 2D1C lane combination. When the reconfigurable pin-to-pin interface 400 is configured to support a 2D1C lane combination in which one external lane (which includes signal wires CSIB_L0P_T2A and CSIB_L0N_T2B) is used as a clock lane, another lane (which includes signal wires CSIB_L1P_T2C and CSIB_L1N_T3A) is used as one data lane, and yet another lane (which includes signal wires CSIB_L2P_T3B and CSIB_L2N_T3C) is used as another data lane, the switch circuit 407 is controlled to have the switches SW1B, SW4B, and SW6B switched on and the switches SW2B, SW3B, and SW5B switched off.

Alternatively, when the reconfigurable pin-to-pin interface 400 is configured to support a 2D1C lane combination in which one external lane (which includes signal wires CSIB_L1P_T2C and CSIB_L1N_T3A) is used as a clock lane, another external lane (which includes signal wires CSIB_L0P_T2A and CSIB_L0N_T2B) is used as one data lane, and yet another external lane (which includes signal wires CSIB_L2P_T3B and CSIB_L2N_T3C) is used as another data lane, the switch circuit 406 is controlled to have the switches SW2B, SW3B, and SW6B switched on and the switches SW1B, SW4B, and SW5B switched off.

Alternatively, when the reconfigurable pin-to-pin interface 400 is configured to support a 2D1C lane combination in which one external lane (which includes signal wires CSIB_L2P_T3B and CSIB_L2N_T3C) is used as a clock lane, another external lane (which includes signal wires CSIB_L0P_T2A and CSIB_L0N_T2B) is used as one data lane, and yet another external lane (which includes signal wires CSIB_L1P_T2C and CSIB_L1N_T3A) is used as another data lane, the switch circuit 407 is controlled to have the switches SW2B, SW4B, and SW5B switched on and the switches SW1B, SW3B, and SW6B switched off.

In a case where an application requires that the reconfigurable pin-to-pin interface 400 is configured to support one 4D1C lane combination, the switch circuit 408 should be properly controlled to enable the associated internal clock lane COM_CK.

When the reconfigurable pin-to-pin interface 400 is configured to support a 4D1C lane combination in which a first external lane (which includes signal wires CSIA_L0P_T0A and CSIA_L0N_T0B) is used as a clock lane, and a second external lane (which includes signal wires CSIA_L1P_T0C and CSIA_L1N_T1A), a third external lane (which includes signal wires CSIA_L2P_T1B and CSIA_L2N_T1C), a fourth external lane (which includes signal wires CSIB_L0P_T2A and CSIB_L0N_T2B), and a fifth external lane (which includes signal wires CSIB_L1P_T2C and CSIB_L1N_T3A) are used as four data lanes, the switch circuit 408 is controlled to have the switches SW1C, SW4C, SW6C, SW8C, and SW10C switched on and the switches SW2C, SW3C, SW5C, SW7C, and SW9C switched off. In this way, a received signal obtained at the output port CK_OUT of an equalizer included in the lane circuit CSIA_DPHY_L0 by receiving a clock signal transmitted via the first external lane (which includes signal wires CSIA_L0P_T0A and CSIA_L0N_T0B) is redirected to the clock input ports CK_IN of samplers included in the lane circuits CSIA_DPHY_L1, CSIA_DPHY_L2, CSIB_DPHY_L0, and CSIB_DPHY_L1 for acting as clock inputs of the samplers included in the lane circuits CSIA_DPHY_L1, CSIA_DPHY_L2, CSIB_DPHY_L0, and CSIB_DPHY_L1.

Further, a received signal obtained at the output port CK_OUT of an equalizer included in the lane circuit CSIA_DPHY_L1 by receiving one data signal transmitted via the second external lane (which includes signal wires CSIA_L1P_T0C and CSIA_L1N_T1A) is fed into a data input port of the sampler included in the lane circuit CSIA_DPHY_L1, and is blocked from being redirected to clock input ports CK_IN of samplers included in the lane circuits CSIA_DPHY_L1, CSIA_DPHY_L2, CSIB_DPHY_L0, and CSIB_DPHY_L1 for acting as clock inputs of the samplers included in the lane circuits CSIA_DPHY_L1, CSIA_DPHY_L2, CSIB_DPHY_L0, and CSIB_DPHY_L1. A received signal obtained at the output port CK_OUT of an equalizer included in the lane circuit CSIA_DPHY_L2 by receiving one data signal transmitted via the third external lane (which includes signal wires CSIA_L2P_T1B and CSIA_L2N_T1C) is fed into a data input port of the sampler included in the lane circuit CSIA_DPHY_L2, and is blocked from being redirected to clock input ports CK_IN of samplers included in the lane circuits CSIA_DPHY_L0, CSIA_DPHY_L1, CSIB_DPHY_L0, and CSIB_DPHY_L1 for acting as clock inputs of the samplers included in the lane circuits CSIA_DPHY_L0, CSIA_DPHY_L1, CSIB_DPHY_L0, and CSIB_DPHY_L1. A received signal obtained at the output port CK_OUT of an equalizer included in the lane circuit CSIB_DPHY_L0 by receiving one data signal transmitted via the fourth external lane (which includes signal wires CSIB_L0P_T2A and CSIB_L0N_T2B) is fed into a data input port of the sampler included in the lane circuit CSIB_DPHY_L0, and is blocked from being redirected to clock input ports CK_IN of samplers included in the lane circuits CSIA_DPHY_L0, CSIA_DPHY_L1, CSIA_DPHY_L2, and CSIB_DPHY_L1 for acting as clock inputs of the samplers included in the lane circuits CSIA_DPHY_L0, CSIA_DPHY_L1, CSIA_DPHY_L2, and CSIB_DPHY_L1. A received signal obtained at the output port CK_OUT of an equalizer included in the lane circuit CSIB_DPHY_L1 by receiving one data signal transmitted via the fifth external lane (which includes signal wires CSIB_L1P_T2C and CSIB_L1N_T3A) is fed into a data input port of the sampler included in the lane circuit CSIB_DPHY_L1, and is blocked from being redirected to clock input ports CK_IN of samplers included in the lane circuits CSIA_DPHY_L0, CSIA_DPHY_L1, CSIA_DPHY_L2, and CSIB_DPHY_L0 for acting as clock inputs of the samplers included in the lane circuits CSIA_DPHY_L0, CSIA_DPHY_L1, CSIA_DPHY_L2, and CSIB_DPHY_L0.

It should be noted that a data output at a data output port of a sampler included in the lane circuit CSIA_DPHY_L0 is invalid, and may be prevented from being retrieved and processed by following data processing circuitry. In addition, the last external lane (which includes signal wires CSIB_L2P_T3B and CSIB_L2N_T3C) and the associated lane circuit CSIB_DPHY_L2 are redundant under the currently selected 4D1C lane combination. In some embodiments of the present invention, the switches SW11C and SW12C may be switched off, and a data output at a data output port of a sampler included in the lane circuit CSIB_DPHY_L2 is invalid, and may be prevented from being retrieved and processed by the following data processing circuitry.

The use of the switch circuit 408 enables the reconfigurable pin-to-pin interface 400 to support one 4D1C lane combination. It should be noted that a 4D1C lane combination is not restricted to the above-mentioned selection of one clock lane and four data lanes. In practice, any of the lane circuits CSIA_DPHY_L0, CSIA_DPHY_L1, CSIA_DPHY_L2, CSIB_DPHY_L0, CSIB_DPHY_L1, CSIB_DPHY_L2 may be selected to be connected to a clock lane, and four of the remaining five lane circuits may be selected to be connected to four data lanes. For example, when the reconfigurable pin-to-pin interface 400 is configured to support a 4D1C lane combination in which a second external lane (which includes signal wires CSIA_L1P_T0C and CSIA_L1N_T1A) is used as a clock lane, and a third external lane (which includes signal wires CSIA_L2P_T1B and CSIA_L2N_T1C), a fourth external lane (which includes signal wires CSIB_L0P_T2A and CSIB_L0N_T2B), a fifth external lane (which includes signal wires CSIB_L1P_T2C and CSIB_L1N_T3A), and a sixth external lane (which includes signal wires CSIB_L2P_T3B and CSIB_L2N_T3C) are used as four data lanes, the switch circuit 408 is controlled to have the switches SW3C, SW6C, SW8C, SW10C, and SW12C switched on and the switches SW4C, SW5C, SW7C, SW9C, and SW11C switched off. In addition, the switches SW1C and SW2C may be switched off, and a data output at a data output port of a sampler included in the lane circuit CSIB_DPHY_L0 is invalid, and may be prevented from being retrieved and processed by the following data processing circuitry. The same objective of enabling the reconfigurable pin-to-pin interface 400 to support one 4D1C lane combination is achieved. Since a person skilled in the pertinent art can readily understand details of other possible 4D1C lane combinations enabled by the switch circuit 408, further description of other possible 4D1C lane combinations and the associated on/off statues of switches in the switch circuit 408 is omitted here for brevity.

As mentioned above, one 1D1C lane combination (e.g., one 1D1C D-PHY configuration) can be enabled by the switch circuit 403, one 1D1C lane combination (e.g., one 1D1C D-PHY configuration) can be enabled by the switch circuit 404, one 1D1C lane combination (e.g., one 1D1C D-PHY configuration) can be enabled by the switch circuit 405, one 2D1C lane combination (e.g., one 2D1C D-PHY configuration) can be enabled by the switch circuit 406, one 2D1C lane combination (e.g., one 2D1C D-PHY configuration) can be enabled by the switch circuit 407, and one 4D1C lane combination (e.g., one 4D1C D-PHY configuration) can be enabled by the switch circuit 408. Hence, the same pins (or pads) 401 of the reconfigurable pin-to-pin interface 400 can be used for connecting to one assembled lane combination (e.g., 4D1C lane combination) or multiple separated lane combinations (e.g., two 2D1C lane combinations), depending upon the actual application requirement. For better understanding of technical features of the reconfigurable pin-to-pin interface 400, several applications are provided as below.

In a first application with only a single camera module such as a high quality camera module (e.g., a 16 megapixel (MP) camera module), the reconfigurable pin-to-pin interface (e.g., MIPI CSI) 400 is used to connect the single camera module, where five lane circuits may be selected from the lane circuits CSIA_DPHY_L0, CSIA_DPHY_L1, CSIA_DPHY_L2, CSIB_DPHY_L0, CSIB_DPHY_L1, CSIB_DPHY_L2 through the switch circuit 408 to support one 4D1C D-PHY lane combination that is capable of meeting the data throughout requirement of the single camera module. Further, all switches included in the switch circuits 403-407 may be switched off.

In a second application with only a single camera module such as a medium quality camera module (e.g., an 8MP camera module), the reconfigurable pin-to-pin interface (e.g., MIPI CSI) 400 is used to connect the single camera module. In one exemplary design, three lane circuits CSIA_DPHY_L0, CSIA_DPHY_L1, CSIA_DPHY_L2 are selected through the switch circuit 406 to support one 2D1C D-PHY lane combination that is capable of meeting the data throughout requirement of the single camera module. Further, all switches included in the switch circuits 403-405 and 407-408 may be switched off. In another exemplary design, three lane circuits CSIB_DPHY_L0, CSIB_DPHY_L1, CSIB_DPHY_L2 are selected through the switch circuit 407 to support one 2D1C D-PHY lane combination that is capable of meeting the data throughout requirement of the single camera module. Further, all switches included in the switch circuits 403-406 and 408 may be switched off.

In a third application with only a single camera module such as a low quality camera module (e.g., a 4MP camera module), the reconfigurable pin-to-pin interface (e.g., MIPI CSI) 400 is used to connect the single camera module. In one exemplary design, two lane circuits CSIA_DPHY_L0 and CSIA_DPHY_L1 are selected through the switch circuit 403 to support one 1D1C D-PHY lane combination that is capable of meeting the data throughout requirement of the single camera module. Further, all switches included in the switch circuits 404-408 may be switched off. In another exemplary design, two lane circuits CSIA_DPHY_L2 and CSIB_DPHY_L0 are selected through the switch circuit 404 to support one 1D1C D-PHY lane combination that is capable of meeting the data throughout requirement of the single camera module. Further, all switches included in the switch circuits 403 and 405-408 may be switched off. In yet another exemplary design, two lane circuits CSIB_DPHY_L1 and CSIB_DPHY_L2 are selected through the switch circuit 405 to support one 1D1C D-PHY lane combination that is capable of meeting the data throughout requirement of the single camera module. Further, all switches included in the switch circuits 403-404 and 406-408 may be switched off.

In a fourth application with two camera modules such as two medium quality camera modules (e.g., 8MP camera modules), the reconfigurable pin-to-pin interface (e.g., MIPI CSI) 400 is used to connect the two camera modules, where three lane circuits CSIA_DPHY_L0, CSIA_DPHY_L1, CSIA_DPHY_L2 are selected through the switch circuit 406 to support one 2D1C D-PHY lane combination that is capable of meeting the data throughout requirement of one camera module, and three lane circuits CSIB_DPHY_L0, CSIB_DPHY_L1, CSIB_DPHY_L2 are selected through the switch circuit 407 to support another 2D1C D-PHY lane combination that is capable of meeting the data throughout requirement of the other camera module. Further, all switches included in the switch circuits 403-405 and 408 may be switched off.

In a fifth application with two camera modules such as one medium quality camera module (e.g., 8MP camera modules) and one low quality camera module (e.g., 4MP camera module), the reconfigurable pin-to-pin interface (e.g., MIPI CSI) 400 is used to connect the two camera modules. In one exemplary design, three lane circuits CSIA_DPHY_L0, CSIA_DPHY_L1, CSIA_DPHY_L2 are selected through the switch circuit 406 to support one 2D1C D-PHY lane combination that is capable of meeting the data throughout requirement of one camera module, and two lane circuits CSIB_DPHY_L1 and CSIB_DPHY_L2 are selected through the switch circuit 405 to support one 1D1C D-PHY lane combination that is capable of meeting the data throughout requirement of the other camera module. Further, all switches included in the switch circuits 403-404 and 407-408 may be switched off. In another exemplary design, three lane circuits CSIB_DPHY_L0, CSIB_DPHY_L1, CSIB_DPHY_L2 are selected through the switch circuit 407 to support one 2D1C D-PHY lane combination that is capable of meeting the data throughout requirement of one camera module, and two lane circuits CSIA_DPHY_L0 and CSIA_DPHY_L1 are selected through the switch circuit 403 to support one 1D1C D-PHY lane combination that is capable of meeting the data throughout requirement of the other camera module. Further, all switches included in the switch circuits 404-406 and 408 may be switched off.

In a sixth application with three camera modules such as three low quality camera modules (e.g., 4MP camera modules), the reconfigurable pin-to-pin interface (e.g., MIPI CSI) 400 is used to connect the three camera modules, where two lane circuit CSIA_DPHY_L0, CSIA_DPHY_L1 are selected through the switch circuit 403 to support one 1D1C D-PHY lane combination that is capable of meeting the data throughout requirement of one camera module, two lane circuit CSIA_DPHY_L2, CSIB_DPHY_L0 are selected through the switch circuit 404 to support another 1D1C D-PHY lane combination that is capable of meeting the data throughout requirement of another camera module, and two lane circuit CSIB_DPHY_L1, CSIB_DPHY_L2 are selected through the switch circuit 405 to support yet another 1D1C D-PHY lane combination that is capable of meeting the data throughout requirement of yet another camera module. Further, all switches included in the switch circuits 406-408 may be switched off.

To put it simply, the lane circuits of the reconfigurable pin-to-pin interface 400 can be assembled to support one assembled lane combination, and can be decomposed to support multiple separated lane combinations. Hence, a lane circuit can be used for dealing with signal reception of one lane combination, and can be reused for dealing with signal reception of a different lane combination. For example, a lane circuit can be used in any of a 1D1C lane combination (e.g., 1D1C D-PHY configuration) and an nD1C lane combination (e.g., nD1C D-PHY configuration), where n may be any positive integer larger than 1 (i.e., n>1). For another example, a lane circuit can be used in any of a 1D1C lane combination, an nD1C lane combination, and an mD1C lane combination, where each of m and n may be any positive integer larger than 1 and m is larger than n (i.e., m>n>1). For yet another example, a lane circuit can be used in any of an nD1C lane combination and an mD1C lane combination, where each of m and n may be any positive integer larger than 1 and m is larger than n (i.e., m>n>1). In this way, a single-camera application and a multi-camera application can be supported by using the same reconfigurable pin-to-pin interface 400 without increasing the pin count and/or the chip area.

In the embodiment shown in FIG. 4, the reconfigurable pin-to-pin interface 400 is capable of support all of the 1D1C lane combination type, the 2D1C lane combination type, and the 4D1C lane combination type. However, this is for illustrative purposes only, and is not meant to be a limitation of the present invention. Alternatively, the reconfigurable pin-to-pin interface 400 may be modified to omit at least one of the switch circuits 403-408. These alternative designs all fall within the scope of the present invention.

Figure 5:
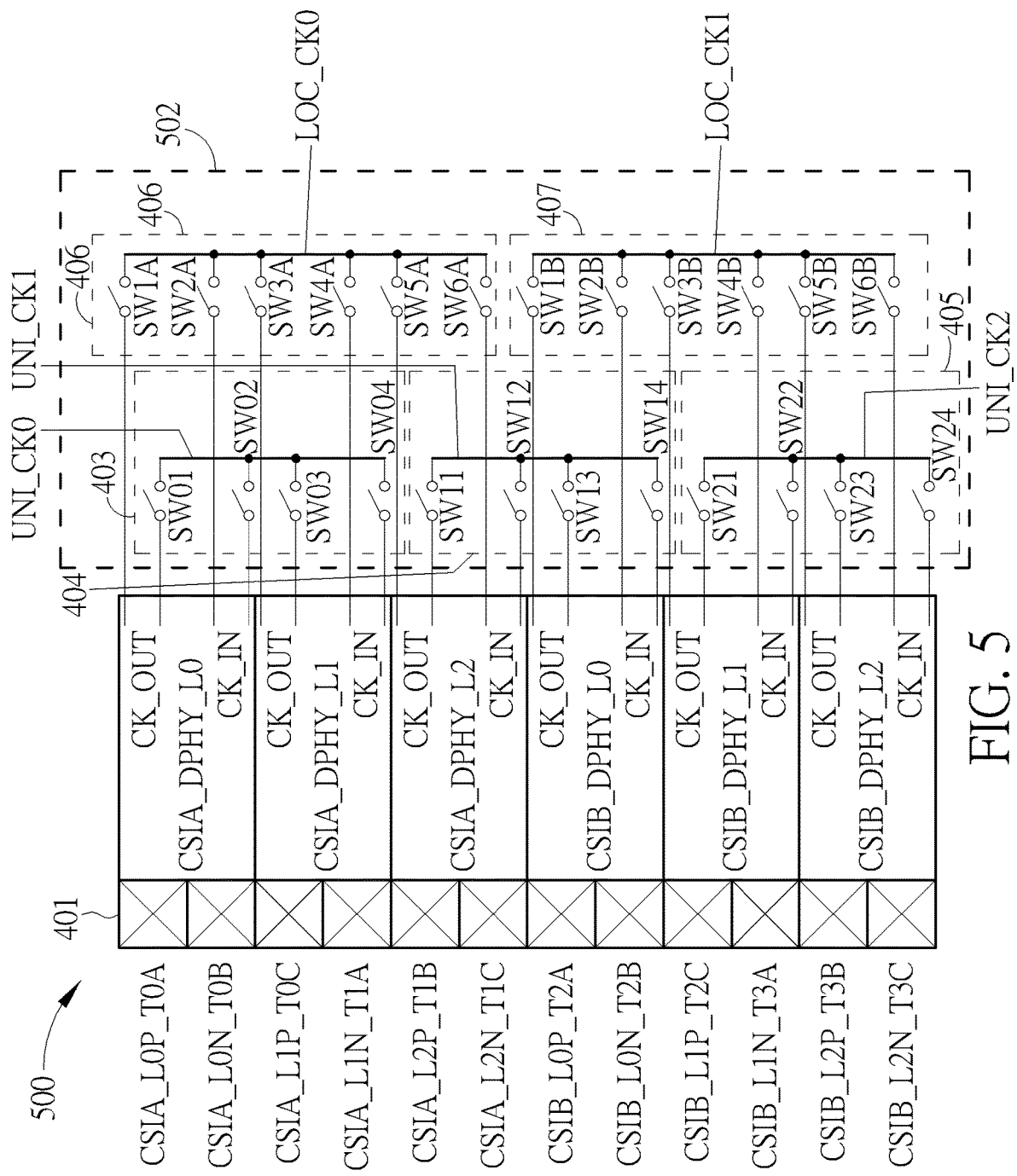
FIG. 5 is a diagram illustrating a second reconfigurable pin-to-pin interface supporting different lane combination types according to an embodiment of the present invention.

FIG. 5 is a diagram illustrating a second reconfigurable pin-to-pin interface supporting different lane combination types according to an embodiment of the present invention. By way of example, but not limitation, the reconfigurable pin-to-pin interface 500 may be used as a MIPI CSI for connecting a first chip to a second chip, where the first chip may include one or more camera modules, and the second chip may include one or more ISPs. Like the reconfigurable pin-to-pin interface 400 shown in FIG. 4, the reconfigurable pin-to-pin interface 500 shown in FIG. 5 has a plurality of pins (or pads) 401 connected to a plurality of external signal wires CSIA_L0P_T0A, CSIA_L0N_T0B, CSIA_L1P_T0C, CSIA_L1N_T1A, CSIA_L2P_T1B, CSIA_L2N_T1C, CSIB_L0P_T2A, CSIB_L0N_T2B, CSIB_L1P_T2C, CSIB_L1N_T3A, CSIB_L2P_T3B, CSIB_L2N_T3C, respectively. In this embodiment, the reconfigurable pin-to-pin interface 500 includes a reconfiguration circuit 502 and a plurality of lane circuits CSIA_DPHY_L0, CSIA_DPHY_L1, CSIA_DPHY_L2, CSIB_DPHY_L0, CSIB_DPHY_L1, and CSIB_DPHY_L2. The major difference between the reconfigurable pin-to-pin interfaces 400 and 500 is that the reconfiguration circuit 502 does not include the switch circuit 408. As mentioned above, each of the switch circuits 403, 404, and 405 is used to enable one 1D1C lane combination (e.g., one 1D1C D-PHY configuration), and each of the switch circuits 406 and 407 is used to enable one 2D1C lane combination (e.g., one 2D1C D-PHY configuration). Hence, compared to the reconfigurable pin-to-pin interface 400, the reconfigurable pin-to-pin interface 500 cannot support one 4D1C lane combination. Since a person skilled in the art can readily understand details of the reconfigurable pin-to-pin interface 500 after reading above paragraphs directed to the reconfigurable pin-to-pin interface 400, further description is omitted here for brevity.

Figure 6:
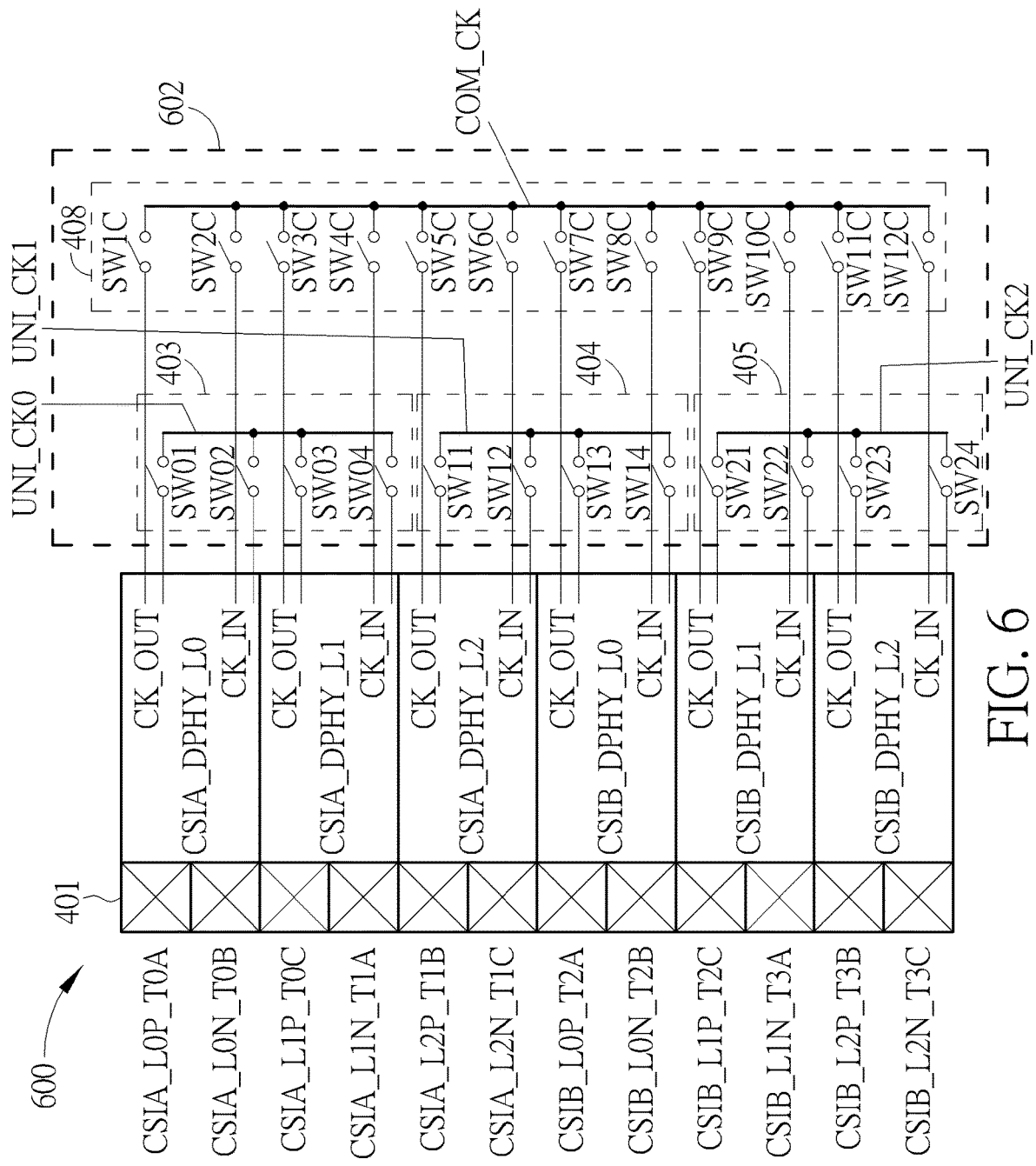
FIG. 6 is a diagram illustrating a third reconfigurable pin-to-pin interface supporting different lane combination types according to an embodiment of the present invention.

FIG. 6 is a diagram illustrating a third reconfigurable pin-to-pin interface supporting different lane combination types according to an embodiment of the present invention. By way of example, but not limitation, the reconfigurable pin-to-pin interface 600 may be used as a MIPI CSI for connecting a first chip to a second chip, where the first chip may include one or more camera modules, and the second chip may include one or more ISPs. Like the reconfigurable pin-to-pin interface 400 shown in FIG. 4, the reconfigurable pin-to-pin interface 600 shown in FIG. 6 has a plurality of pins (or pads) 401 connected to a plurality of signal wires CSIA_L0P_T0A, CSIA_L0N_T0B, CSIA_L1P_T0C, CSIA_L1N_T1A, CSIA_L2P_T1B, CSIA_L2N_T1C, CSIB_L0P_T2A, CSIB_L0N_T2B, CSIB_L1P_T2C, CSIB_L1N_T3A, CSIB_L2P_T3B, CSIB_L2N_T3C, respectively. In this embodiment, the reconfigurable pin-to-pin interface 600 includes a reconfiguration circuit 602 and a plurality of lane circuits CSIA_DPHY_L0, CSIA_DPHY_L1, CSIA_DPHY_L2, CSIB_DPHY_L0, CSIB_DPHY_L1, and CSIB_DPHY_L2. The major difference between the reconfigurable pin-to-pin interfaces 400 and 600 is that the reconfiguration circuit 602 does not include the switch circuits 406 and 407. As mentioned above, each of the switch circuits 403, 404, and 405 is used to enable one 1D1C lane combination (e.g., one 1D1C D-PHY configuration), and the switch circuit 408 is used to enable one 4D1C lane combination (e.g., one 4D1C D-PHY configuration). Hence, compared to the reconfigurable pin-to-pin interface 400, the reconfigurable pin-to-pin interface 600 cannot support two separate 2D1C lane combinations at the same time. Since a person skilled in the art can readily understand details of the reconfigurable pin-to-pin interface 600 after reading above paragraphs directed to the reconfigurable pin-to-pin interface 400, further description is omitted here for brevity.

Figure 7:
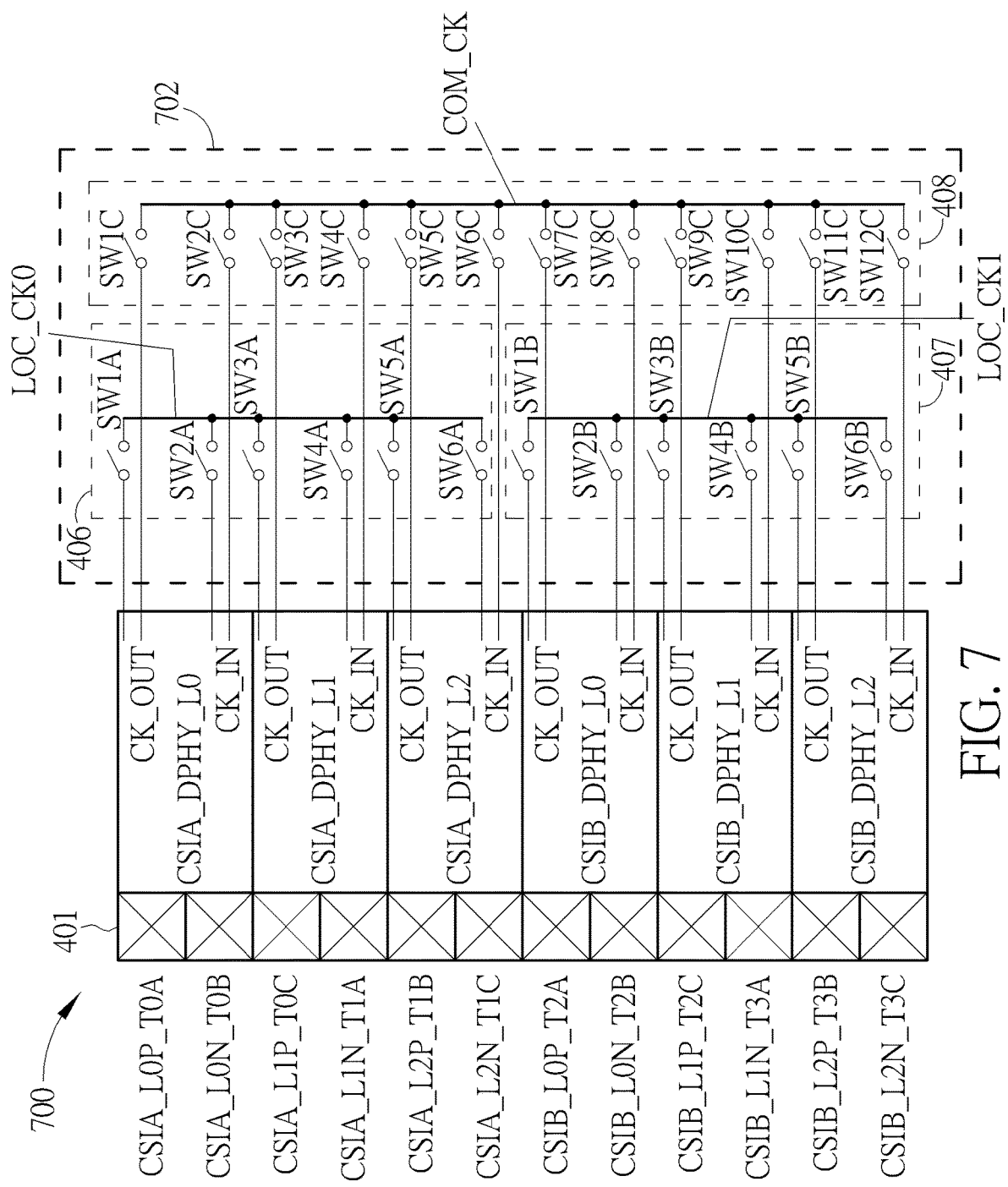
FIG. 7 is a diagram illustrating a fourth reconfigurable pin-to-pin interface supporting different lane combination types according to an embodiment of the present invention.

FIG. 7 is a diagram illustrating a fourth reconfigurable pin-to-pin interface supporting different lane combination types according to an embodiment of the present invention. By way of example, but not limitation, the reconfigurable pin-to-pin interface 700 may be used as a MIPI CSI for connecting a first chip to a second chip, where the first chip may include one or more camera modules, and the second chip may include one or more ISPs. Like the reconfigurable pin-to-pin interface 400 shown in FIG. 4, the reconfigurable pin-to-pin interface 700 shown in FIG. 7 has a plurality of pins (or pads) 401 connected to a plurality of signal wires CSIA_L0P_T0A, CSIA_L0N_T0B, CSIA_L1P_T0C, CSIA_L1N_T1A, CSIA_L2P_T1B, CSIA_L2N_T1C, CSIB_L0P_T2A, CSIB_L0N_T2B, CSIB_L1P_T2C, CSIB_L1N_T3A, CSIB_L2P_T3B, CSIB_L2N_T3C, respectively. In this embodiment, the reconfigurable pin-to-pin interface 700 includes a reconfiguration circuit 702 and a plurality of lane circuits CSIA_DPHY_L0, CSIA_DPHY_L1, CSIA_DPHY_L2, CSIB_DPHY_L0, CSIB_DPHY_L1, and CSIB_DPHY_L2. The major difference between the reconfigurable pin-to-pin interfaces 400 and 700 is that the reconfiguration circuit 702 does not include the switch circuits 403, 404, and 405. As mentioned above, each of the switch circuits 406 and 407 is used to enable one 2D1C lane combination (e.g., one 2D1C D-PHY configuration), and the switch circuit 408 is used to enable one 4D1C lane combination (e.g., one 4D1C D-PHY configuration). Hence, compared to the reconfigurable pin-to-pin interface 400, the reconfigurable pin-to-pin interface 700 cannot support three separate 1D1C lane combinations at the same time. Since a person skilled in the art can readily understand details of the reconfigurable pin-to-pin interface 700 after reading above paragraphs directed to the reconfigurable pin-to-pin interface 400, further description is omitted here for brevity.

Figure 8:
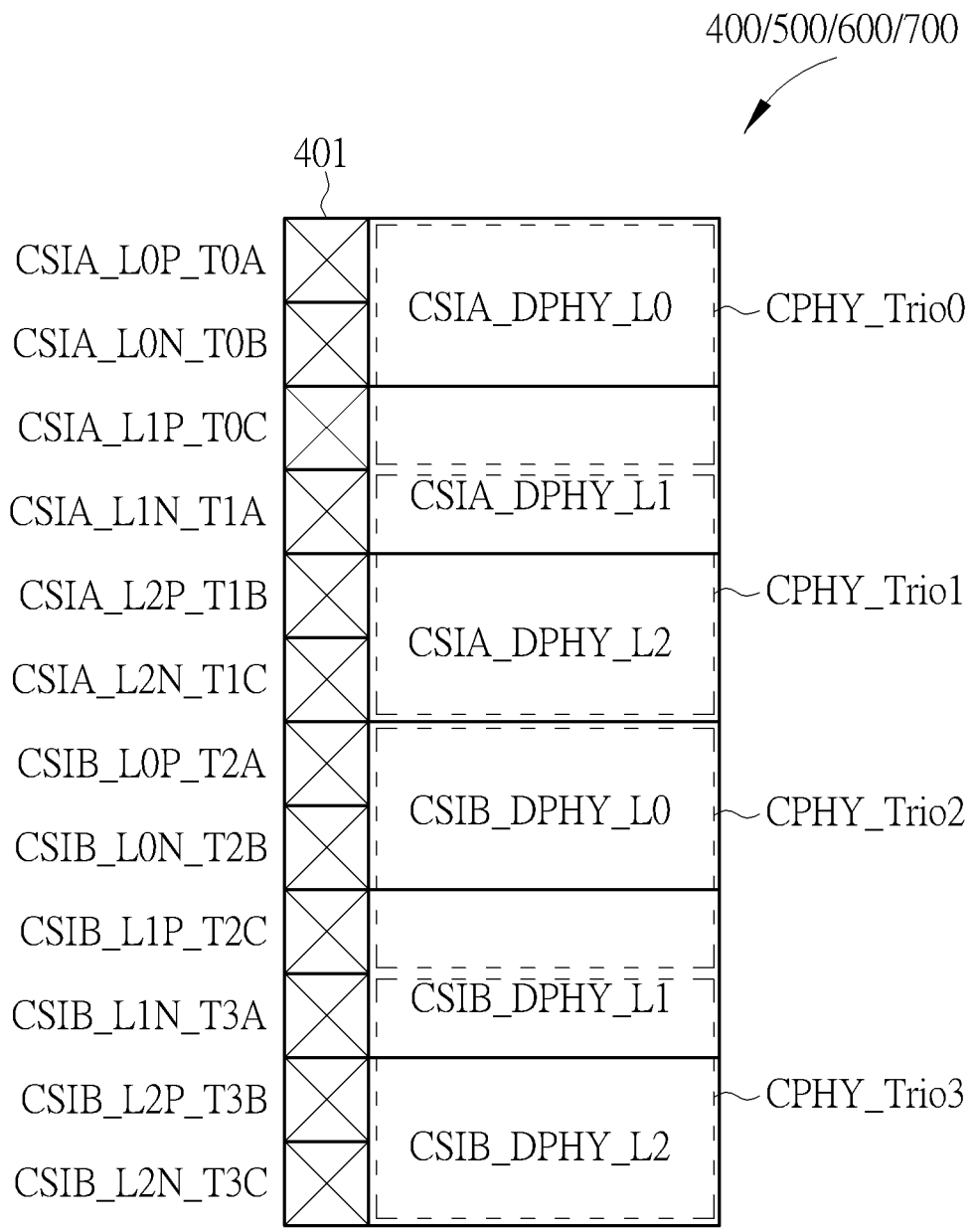
FIG. 8 is a diagram illustrating a reconfigurable pin-to-pin interface with a C-PHY/D-PHY combo design according to an embodiment of the present invention.

In some embodiments of the present invention, the reconfigurable pin-to-pin interface 400/500/600/700 may support both of MIPI C-PHY and MIPI D-PHY. In other words, the pins (or pads) of the reconfigurable pin-to-pin interface 400/500/600/700 can be used to connect 3-wire C-PHY lanes and/or 2-wire D-PHY lanes. FIG. 8 is a diagram illustrating a reconfigurable pin-to-pin interface with a C-PHY/D-PHY combo design according to an embodiment of the present invention. In a case where a physical layer (PHY) of the reconfigurable pin-to-pin interface 400/500/600/700 is MIPI D-PHY, pins (or pads) 401 of the reconfigurable pin-to-pin interface 400/500/600/700 may have a first pin assignment for receiving input signals transmitted via D-PHY lanes, where a lane circuit CSIA_DPHY_L0 is connected to a D-PHY lane having signal wires CSIA_L0P_T0A and CSIA_L0N_T0B, a lane circuit CSIA_DPHY_L1 is connected to a D-PHY lane having signal wires CSIA_L1P_T0C and CSIA_L1N_T1A, a lane circuit CSIA_DPHY_L2 is connected to a D-PHY lane having signal wires CSIA_L2P_T1B and CSIA_L2N_T1C, a lane circuit CSIB_DPHY_L0 is connected to a D-PHY lane having signal wires CSIB_L0P_T2A and CSIB_L0N_T2B, a lane circuit CSIB_DPHY_L1 is connected to a D-PHY lane having signal wires CSIB_L1P_T2C and CSIB_L1N_T3A, and a lane circuit CSIB_DPHY_L2 is connected to a D-PHY lane having signal wires CSIB_L2P_T3B and CSIB_L2N_T3C.

In another case where the physical layer of the reconfigurable pin-to-pin interface 400/500/600/700 is MIPI C-PHY, the pins 104 of the reconfigurable pin-to-pin interface 400/500/600/700 may have a second pin assignment for receiving input signals transmitted via C-PHY lanes. Each C-PHY lane includes three signal wires. The lane circuits CSIA_DPHY_L0, CSIA_DPHY_L1, CSIA_DPHY_L2, CSIB_DPHY_L0, CSIB_DPHY_L1, CSIB_DPHY_L2 used by the reconfigurable pin-to-pin interface 400/500/600/700 acting as a MIPI D-PHY interface can be properly divided and grouped to form four lane circuits CPHY_Trio0, CPHY_Trio1, CPHY_Trio2, CPHY_Trio3 needed by the reconfigurable pin-to-pin interface 400/500/600/700 acting as a MIPI C-PHY interface, where the lane circuit CPHY_Trio0 is connected to a C-PHY lane having signal wires CSIA_L0P_T0A, CSIA_L0N_T0B, and CSIA_L1P_T0C, the lane circuit CPHY_Trio1 is connected to a C-PHY lane having signal wires CSIA_L1N_T1A, CSIA_L2P_T1B, and CSIA_L2N_T1C, the lane circuit CPHY_Trio2 is connected to a C-PHY lane having signal wires CSIB_L0P_T2A, CSIB_L0N_T2B, and CSIB_L1P_T2C, and the lane circuit CPHY_Trio3 is connected to a C-PHY lane having signal wires CSIB_L1N_T3A, CSIB_L2P_T3B, and CSIB_L2N_T3C.

Consider a case where a first application has only a single camera module, and the reconfigurable pin-to-pin interface (e.g., MIPI CSI) 400/500/600/700 in FIG. 8 is used to act as a MIPI C-PHY interface to connect the single camera module. All of the four C-PHY lanes may be used to meet the data throughout requirement of the single camera module.

Consider a case where a second application has two camera modules, and the reconfigurable pin-to-pin interface (e.g., MIPI CSI) 400/500/600/700 in FIG. 8 is used to act as a MIPI C-PHY interface to connect the two camera modules. In one exemplary design, three C-PHY lanes may be used to meet the data throughout requirement of one camera module, and the remaining one C-PHY lane may be used to meet the data throughout requirement of the other camera module. In another exemplary design, two C-PHY lanes may be used to meet the data throughout requirement of one camera module, and the remaining two C-PHY lane may be used to meet the data throughout requirement of the other camera module.

Consider a case where a third application has four camera modules, and the reconfigurable pin-to-pin interface (e.g., MIPI CSI) 400/500/600/700 in FIG. 8 is used to act as a MIPI C-PHY interface to connect the three camera modules. The four C-PHY lanes may be connected to the four camera modules, respectively, such that each C-PHY lane can meet the data throughout requirement of one camera module.

It should be noted that the reconfigurable pin-to-pin interface 400/500/600/700 may be configured to operate in a hybrid mode which allows co-existence of a MIPI C-PHY interface and a MIPI D-PHY interface. For example, a first part of the reconfigurable pin-to-pin interface 400/500/600/700 is used to act as a MIPI D-PHY interface, and a second part of the reconfigurable pin-to-pin interface 400/500/600/700 is used to act as a MIPI C-PHY interface. In other words, the pins (or pads) 401 of the reconfigurable pin-to-pin interface 400/500/600/700 may be divided into a first group of pins and a second group of pins, where the first group of pins are connected to one or more D-PHY lanes, and the second group of pins are connected to one or more C-PHY lanes. Taking an application with two camera modules for example, the reconfigurable pin-to-pin interface (e.g., MIPI CSI) 400/500/600/700 in FIG. 8 may be connected to one camera module via a 2D1C lane combination (which has three D-PHY lanes), and may be connected to the other camera module via two C-PHY lanes.

To put it simply, the same reconfigurable pin-to-pin interface 400/500/600/700 can be compatible with both of MIPI C-PHY and MIPI D-PHY. Hence, a lane circuit may be used for dealing with signal reception of a D-PHY lane, and may be reused for dealing with signal reception of a C-PHY lane. In this way, the same reconfigurable pin-to-pin interface can be used to provide required MIPI C-PHY connections and/or required MIPI D-PHY connections without increasing the pin count and/or the chip area.

It should be noted that the number of D-PHY lanes and/or the number of C-PHY lanes supported by the reconfigurable pin-to-pin interface 400/500/600/700 are for illustrative purposes only, and are not meant to be limitations of the present invention. In practice, the reconfigurable pin-to-pin interface 400/500/600/700 can be extended to support more D-PHY lanes (e.g., 8 D-PHY lanes or 16 D-PHY lanes) and/or more C-PHY lanes (e.g., 5 C-PHY lanes or 6 C-PHY lanes) for high quality sensor applications. It should be noted that, when the reconfigurable pin-to-pin interface 400/500/600/700 is extended to support more D-PHY lanes (e.g., 8 D-PHY lanes or 16 D-PHY lanes), the number of supported D-PHY lane combination types and the maximum number of D-PHY lane combinations available under the same D-PHY lane combination type can be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A reconfigurable pin-to-pin interface comprising:
   a plurality of lane circuits, each arranged to obtain a received signal by receiving an input signal transmitted via a lane, wherein the lane circuits comprise:
      a first lane circuit, arranged to obtain a first received signal by receiving a first input signal transmitted via a first lane; and
      a second lane circuit, arranged to obtain a second received signal by receiving a second input signal transmitted via a second lane; and
   a reconfiguration circuit, wherein when the second lane is used as one data lane and the first lane is used as one clock lane, the reconfiguration circuit is arranged to redirect the first received signal to the second lane circuit for acting as an clock input of the second lane circuit, and when the first lane is used as one data lane, the reconfiguration circuit is arranged to block the first received signal from being redirected to the second lane circuit for acting as the clock input of the second lane circuit;
   wherein when the first lane is used as one data lane and the second lane is used as one clock lane, the reconfiguration circuit is arranged to redirect the second received signal to the first lane circuit for acting as an clock input of the first lane circuit; and when the second lane is used as one data lane, the reconfiguration circuit is arranged to block the second received signal from being redirected to the first lane circuit for acting as the clock input of the first lane circuit.

2. The reconfigurable pin-to-pin interface of claim 1, wherein when the reconfigurable pin-to-pin interface is configured to support a first lane combination in which one lane is used as one clock lane and a single remaining lane is used as one data lane, the reconfiguration circuit is arranged to redirect a received signal of a lane circuit associated with said one lane of the first lane combination to a lane circuit associated with said single remaining lane of the first lane combination for acting as a clock input; when the reconfigurable pin-to-pin interface is configured to support a second lane combination in which one lane is used as one clock lane and remaining lanes are used as a plurality of data lanes, the reconfiguration circuit is arranged to redirect a received signal of a lane circuit associated with said one lane of the second lane combination to lane circuits associated with said remaining lanes of the second lane combination for acting as clock inputs; and the first lane circuit and the second lane circuit are comprised in the lane circuit associated with said one lane of the first lane combination and the lane circuit associated with said single remaining lane of the first lane combination, and are also comprised in the lane circuit associated with said one lane of the second lane combination and the lane circuits associated with said remaining lanes of the second lane combination.

3. The reconfigurable pin-to-pin interface of claim 2, wherein when the reconfigurable pin-to-pin interface is configured to support a third lane combination in which one lane is used as one clock lane and remaining lanes are used as a plurality of data lanes, the reconfiguration circuit is arranged to redirect a received signal of a lane circuit associated with said one lane of the third lane combination to lane circuits associated with said remaining lanes of the third lane combination for acting as clock inputs; a number of said remaining lanes of the third lane combination is larger than a number of said remaining lanes of the second lane combination; and the first lane circuit and the second lane circuit are also comprised in the lane circuit associated with said one lane of the third lane combination and the lane circuits associated with said remaining lanes of the third lane combination.

4. The reconfigurable pin-to-pin interface of claim 1, wherein when the reconfigurable pin-to-pin interface is configured to support a first lane combination in which one lane is used as one clock lane and remaining lanes are used as a plurality of data lanes, the reconfiguration circuit is arranged to redirect a received signal of a lane circuit associated with said one lane of the first lane combination to lane circuits associated with said remaining lanes of the first lane combination for acting as clock inputs; when the reconfigurable pin-to-pin interface is configured to support a second lane combination in which one lane is used as one clock lane and remaining lanes are used as a plurality of data lanes, the reconfiguration circuit is arranged to redirect a received signal of a lane circuit associated with said one lane of the second lane combination to lane circuits associated with said remaining lanes of the second lane combination for acting as clock inputs; a number of said remaining lanes of the second lane combination is larger than a number of said remaining lanes of the first lane combination; and the first lane circuit and the second lane circuit are comprised in the lane circuit associated with said one lane of the first lane combination and the lane circuits associated with said remaining lanes of the first lane combination, and are also comprised in the lane circuit associated with said one lane of the second lane combination and the lane circuits associated with said remaining lanes of the second lane combination.

5. The reconfigurable pin-to-pin interface of claim 1, wherein the reconfigurable pin-to-pin interface is used as a camera serial interface (CSI) of a Mobile Industry Processor Interface (MIPI).

6. The reconfigurable pin-to-pin interface of claim 1, wherein at least a part of the reconfigurable pin-to-pin interface is compatible with both of Mobile Industry Processor Interface (MIPI) D-PHY and MIPI C-PHY.

7. A reconfigurable pin-to-pin interface comprising:
   a plurality of lane circuits, each arranged to obtain a received signal by receiving an input signal transmitted via a lane, wherein the lane circuits comprise:
      a first lane circuit, arranged to obtain a first received signal by receiving a first input signal transmitted via a first lane; and
      a second lane circuit, arranged to obtain a second received signal by receiving a second input signal transmitted via a second lane; and
   a reconfiguration circuit, comprising:
      a first switch circuit, coupled to an output port of the first lane circuit and a clock input port of the second lane circuit, wherein the first switch circuit comprises at least one switch, and is arranged to selectively redirect the first received signal at the output port of the first lane circuit to the clock input port of the second lane circuit;
   wherein the first switch circuit is further coupled to an output port of the second lane circuit and a clock input port of the first lane circuit, and the first switch circuit is further arranged to selectively redirect the second received signal at the output port of the second lane circuit to the clock input port of the first lane circuit.

8. The reconfigurable pin-to-pin interface of claim 7, wherein the lane circuits further comprise:
   a third lane circuit, arranged to obtain a third received signal by receiving a third input signal transmitted via a third lane;
   the reconfiguration circuit further comprises:
   a second switch circuit, coupled to the output ports and the clock input ports of the first lane circuit and the second lane circuit, and an output port and a clock input port of the third lane circuit, wherein the second switch circuit comprises switches, and is arranged to:
      selectively redirect the first received signal at the output port of the first lane circuit to the clock input ports of the second lane circuit and the third lane circuit;
      selectively redirect the second received signal at the output port of the second lane circuit to the clock input ports of the first lane circuit and the third lane circuit; and
      selectively redirect the third received signal at the output port of the third lane circuit to the clock input ports of the first lane circuit and the second lane circuit.

9. The reconfigurable pin-to-pin interface of claim 8, wherein the lane circuits further comprise:
   a fourth lane circuit, arranged to obtain a fourth received signal by receiving a fourth input signal transmitted via a fourth lane;
   the reconfiguration circuit further comprises:
   a third switch circuit, coupled to the output port and the clock input port of the third lane circuit and an output port and a clock input port of the fourth lane circuit, wherein the third switch circuit comprises switches, and is arranged to:
      selectively redirect the third received signal at the output port of the third lane circuit to the clock input port of the fourth lane circuit; and
      selectively redirect the fourth received signal at the output port of the fourth lane circuit to the clock input port of the third lane circuit.

10. The reconfigurable pin-to-pin interface of claim 9, wherein the lane circuits further comprise:
   a fifth lane circuit, arranged to obtain a fifth received signal by receiving a fifth input signal transmitted via a fifth lane;
   the reconfiguration circuit further comprises:
   a fourth switch circuit, coupled to the output ports and the clock input ports of the first lane circuit, the second lane circuit, the third lane circuit and the fourth lane circuit, and an output port and a clock input port of the fifth lane circuit, wherein the fourth switch circuit comprises switches, and is arranged to:
      selectively redirect the first received signal at the output port of the first lane circuit to the clock input ports of the second lane circuit, the third lane circuit, the fourth lane circuit and the fifth lane circuit;
      selectively redirect the second received signal at the output port of the second lane circuit to the clock input ports of the first lane circuit, the third lane circuit, the fourth lane circuit and the fifth lane circuit;
      selectively redirect the third received signal at the output port of the third lane circuit to the clock input ports of the first lane circuit, the second lane circuit, the fourth lane circuit and the fifth lane circuit;
      selectively redirect the fourth received signal at the output port of the fourth lane circuit to the clock input ports of the first lane circuit, the second lane circuit, the third lane circuit and the fifth lane circuit; and
      selectively redirect the fifth received signal at the output port of the fifth lane circuit to the clock input ports of the first lane circuit, the second lane circuit, the third lane circuit and the fourth lane circuit.

11. The reconfigurable pin-to-pin interface of claim 10, wherein the lane circuits comprise:
   a sixth lane circuit, arranged to obtain a sixth received signal by receiving a sixth input signal transmitted via a sixth lane;
   the reconfiguration circuit further comprises:
   a fifth switch circuit, coupled to the output port and the clock input port of the fifth lane circuit and an output port and a clock input port of the sixth lane circuit, wherein the fifth switch circuit comprises switches, and is arranged to:
  selectively redirect the fifth received signal at the output port of the fifth lane circuit to the clock input port of the sixth lane circuit; and
  selectively redirect the sixth received signal at the output port of the sixth lane circuit to the clock input port of the fifth lane circuit; and
a sixth switch circuit, coupled to the output ports and the clock input ports of the fourth lane circuit, the fifth lane circuit and the sixth lane circuit, wherein the sixth switch circuit comprises switches, and is arranged to:
  selectively redirect the fourth received signal at the output port of the fourth lane circuit to the clock input ports of the fifth lane circuit and the sixth lane circuit;
  selectively redirect the fifth received signal at the output port of the fifth lane circuit to the clock input ports of the fourth lane circuit and the sixth lane circuit; and
  selectively redirect the sixth received signal at the output port of the sixth lane circuit to the clock input ports of the fourth lane circuit and the fifth lane circuit.

12. The reconfigurable pin-to-pin interface of claim 11, wherein the fourth switch circuit is further coupled to the output port and the clock input port of the sixth lane circuit, and is arranged to:
  selectively redirect the first received signal at the output port of the first lane circuit to the clock input ports of four lane circuits selected from the second lane circuit, the third lane circuit, the fourth lane circuit, the fifth lane circuit and the sixth lane circuit;
  selectively redirect the second received signal at the output port of the second lane circuit to the clock input ports of four lane circuits selected from the first lane circuit, the third lane circuit, the fourth lane circuit, the fifth lane circuit and the sixth lane circuit;
  selectively redirect the third received signal at the output port of the third lane circuit to the clock input ports of four lane circuits selected from the first lane circuit, the second lane circuit, the fourth lane circuit, the fifth lane circuit and the sixth lane circuit;
  selectively redirect the fourth received signal at the output port of the fourth lane circuit to the clock input ports of four lane circuits selected from the first lane circuit, the second lane circuit, the third lane circuit, the fifth lane circuit and the sixth lane circuit;
  selectively redirect the fifth received signal at the output port of the fifth lane circuit to the clock input ports of four lane circuits selected from the first lane circuit, the second lane circuit, the third lane circuit, the fourth lane circuit and the sixth lane circuit; and
  selectively redirect the sixth received signal at the output port of the sixth lane circuit to the clock input ports of four lane circuits selected from the first lane circuit, the second lane circuit, the third lane circuit, the fourth lane circuit and the fifth lane.

13. The reconfigurable pin-to-pin interface of claim 7, wherein the lane circuits further comprise:
  a third lane circuit, arranged to obtain a third received signal by receiving a third input signal transmitted via a third lane;
  a fourth lane circuit, arranged to obtain a fourth received signal by receiving a fourth input signal transmitted via a fourth lane; and
  a fifth lane circuit, arranged to obtain a fifth received signal by receiving a fifth input signal transmitted via a fifth lane;
the first switch circuit is further coupled to an output port and a clock input of the third lane circuit, the first switch circuit comprises switches, and is further arranged to:
  selectively redirect the first received signal at the output port of the first lane circuit to the clock input port of the third lane circuit;
  selectively redirect the second received signal at the output port of the second lane circuit to the clock input port of the third lane circuit; and
  selectively redirect the third received signal at the output port of the third lane circuit to the clock input ports of the first lane circuit and the second lane circuit;
the reconfiguration circuit further comprises:
a second switch circuit, coupled to the output ports and the clock input ports of the first lane circuit, the second lane circuit, the third lane circuit and the fourth lane circuit, and an output port and a clock input port of the fifth lane circuit, wherein the fourth switch circuit comprises switches, and is arranged to:
  selectively redirect the first received signal at the output port of the first lane circuit to the clock input ports of the second lane circuit, the third lane circuit, the fourth lane circuit and the fifth lane circuit;
  selectively redirect the second received signal at the output port of the second lane circuit to the clock input ports of the first lane circuit, the third lane circuit, the fourth lane circuit and the fifth lane circuit;
  selectively redirect the third received signal at the output port of the third lane circuit to the clock input ports of the first lane circuit, the second lane circuit, the fourth lane circuit and the fifth lane circuit;
  selectively redirect the fourth received signal at the output port of the fourth lane circuit to the clock input ports of the first lane circuit, the second lane circuit, the third lane circuit and the fifth lane circuit; and
  selectively redirect the fifth received signal at the output port of the fifth lane circuit to the clock input ports of the first lane circuit, the second lane circuit, the third lane circuit and the fourth lane circuit.

14. The reconfigurable pin-to-pin interface of claim 7, wherein the lane circuits further comprise:
  a third lane circuit, arranged to obtain a third received signal by receiving a third input signal transmitted via a third lane;
  a fourth lane circuit, arranged to obtain a fourth received signal by receiving a fourth input signal transmitted via a fourth lane; and
  a fifth lane circuit, arranged to obtain a fifth received signal by receiving a fifth input signal transmitted via a fifth lane;
wherein
the reconfiguration circuit further comprises:
a second switch circuit, coupled to an output port and a clock input port of the third lane circuit and an output port and a clock input port of the fourth lane circuit, wherein the second switch circuit comprises switches, and is arranged to:
  selectively redirect the third received signal at the output port of the third lane circuit to the clock input port of the fourth lane circuit; and selectively redirect the fourth received signal at the output port of the fourth lane circuit to the clock input port of the third lane circuit; and a third switch circuit, coupled to the output ports and the clock input ports of the first lane circuit, the second lane circuit, the third lane circuit and the fourth lane circuit, and an output port and a clock input port of the fifth lane circuit, wherein the third switch circuit comprises switches, and is arranged to:

selectively redirect the first received signal at the output port of the first lane circuit to the clock input ports of the second lane circuit, the third lane circuit, the fourth lane circuit and the fifth lane circuit;

selectively redirect the second received signal at the output port of the second lane circuit to the clock input ports of the first lane circuit, the third lane circuit, the fourth lane circuit and the fifth lane circuit;

selectively redirect the third received signal at the output port of the third lane circuit to the clock input ports of the first lane circuit, the second lane circuit, the fourth lane circuit and the fifth lane circuit;

selectively redirect the fourth received signal at the output port of the fourth lane circuit to the clock input ports of the first lane circuit, the second lane circuit, the third lane circuit and the fifth lane circuit; and selectively redirect the fifth received signal at the output port of the fifth lane circuit to the clock input ports of the first lane circuit, the second lane circuit, the third lane circuit and the fourth lane circuit.

15. The reconfigurable pin-to-pin interface of claim 7, wherein the reconfigurable pin-to-pin interface is used as a camera serial interface (CSI) of a Mobile Industry Processor Interface (MIPI).

16. The reconfigurable pin-to-pin interface of claim 7, wherein at least a part of the reconfigurable pin-to-pin interface is compatible with both of Mobile Industry Processor Interface (MIPI) D-PHY and MIPI C-PHY.

17. A method for setting a reconfigurable pin-to-pin interface, the reconfigurable pin-to-pin interface comprising a first lane circuit arranged to obtain a first received signal by receiving a first input signal transmitted via a first lane and a second lane circuit arranged to obtain a second received signal by receiving a second input signal transmitted via a second lane, the method comprising:

when the second lane is used as one data lane and the first lane is used as one clock lane, redirecting the first received signal to the second lane circuit for acting as an clock input of the second lane circuit;

when the first lane is used as one data lane, blocking the first received signal from being redirected to the second lane circuit for acting as the clock input of the second lane circuit;

when the first lane is used as one data lane and the second lane is used as one clock lane, redirecting the second received signal to the first lane circuit for acting as an clock input of the first lane circuit; and when the second lane is used as one data lane, blocking the second received signal from being redirected to the first lane circuit for acting as the clock input of the first lane circuit.

* * * * *